United States Patent
Feng et al.

(10) Patent No.: US 12,222,486 B2
(45) Date of Patent: Feb. 11, 2025

(54) LIGHT SOURCE APPARATUS, MICROSCOPIC DEVICE, OPTICAL DETECTION DEVICE AND OPTICAL DETECTION METHOD

(71) Applicant: BIOACES (SHANGHAI) LIFE SCIENCE CO., LTD, Shanghai (CN)

(72) Inventors: Ziyin Feng, Shanghai (CN); Minbiao Ji, Shanghai (CN)

(73) Assignee: BIOACES (SHANGHAI) LIFE SCIENCE CO., LTD, Shanghai (CN)

( * ) Notice: Subject to any disclaimer, the term of this patent is extended or adjusted under 35 U.S.C. 154(b) by 0 days.

(21) Appl. No.: 18/269,933

(22) PCT Filed: Feb. 19, 2021

(86) PCT No.: PCT/CN2021/076825
§ 371 (c)(1),
(2) Date: Jun. 27, 2023

(87) PCT Pub. No.: WO2022/141773
PCT Pub. Date: Jul. 7, 2022

(65) Prior Publication Data
US 2024/0012228 A1    Jan. 11, 2024

(30) Foreign Application Priority Data

Dec. 28, 2020  (CN) .......................... 202011582795.3
Dec. 28, 2020  (CN) .......................... 202011582981.7
Dec. 28, 2020  (CN) .......................... 202011583924.0

(51) Int. Cl.
G02B 21/06    (2006.01)
G02B 21/00    (2006.01)
(Continued)

(52) U.S. Cl.
CPC ........... *G02B 21/06* (2013.01); *G02B 21/125* (2013.01); *G02B 21/16* (2013.01); *G02B 27/1006* (2013.01); *G02B 27/141* (2013.01)

(58) Field of Classification Search
CPC .... G02B 21/06; G02B 21/00; G02B 21/0004; G02B 21/0008; G02B 21/0016;
(Continued)

(56) References Cited

U.S. PATENT DOCUMENTS 583,336 A    5/1897  Rudolph
4,585,315 A * 4/1986 Sincerbox ............ G02B 21/125
                                                    359/861
(Continued)

FOREIGN PATENT DOCUMENTS

CN    101950083 A    1/2011
CN    103091840 A    5/2013
(Continued)

OTHER PUBLICATIONS

WIPO, International Search Report and Written Opinion in counterpart International Patent Application No. PCT/CN2021/076825, mailed on Sep. 16, 2021.
(Continued)

*Primary Examiner* — Thong Q Nguyen
(74) *Attorney, Agent, or Firm* — Leydig, Voit & Mayer, Ltd.

(57) ABSTRACT

The present disclosure relates to a light source apparatus, a microscopic device, an optical detection device, and an optical detection method. The light source apparatus comprises: an illumination light source configured to generate illumination light; and a diaphragm disposed on an emergent light path of the illumination light source, comprising: a light shielding screen configured to block part of the illumination light; a first light-transmitting portion provided on
(Continued)

the light shielding screen and covering a center of the diaphragm, the first light-transmitting portion being configured to make part of the illumination light transmit therethrough to form bright-field illumination; and a second light-transmitting portion provided on the light shielding screen and located at a periphery of the first light-transmitting portion, the second light-transmitting portion being configured to make part of the illumination light transmit therethrough to form dark-field illumination.

12 Claims, 15 Drawing Sheets

(51) Int. Cl.
  *G02B 21/12* (2006.01)
  *G02B 21/16* (2006.01)
  *G02B 27/10* (2006.01)
  *G02B 27/14* (2006.01)

(58) Field of Classification Search
  CPC ........... G02B 21/0032; G02B 21/0052; G02B 21/0056; G02B 21/0064; G02B 21/0076; G02B 21/10; G02B 21/12; G02B 21/125; G02B 21/14; G02B 21/16; G02B 21/361; G02B 27/10; G02B 27/1006; G02B 27/106; G02B 27/12; G02B 27/126; G02B 27/14; G02B 27/141
  USPC .................................................. 359/368–385
  See application file for complete search history.

(56) References Cited

U.S. PATENT DOCUMENTS

| | | | |
|---|---|---|---|
| 4,671,627 A | 6/1987 | Shinohara | |
| 5,580,162 A * | 12/1996 | Murakami | G01N 21/8806 362/322 |
| 5,838,502 A * | 11/1998 | Park | G11B 7/1374 369/112.28 |
| 5,883,336 A | 3/1999 | Jones | |
| 8,154,796 B2 * | 4/2012 | Araki | G02B 21/0076 359/389 |
| 8,547,427 B2 * | 10/2013 | Hanano | G02B 23/2469 348/79 |
| 8,922,885 B2 * | 12/2014 | Ganser | G02B 21/16 359/385 |
| 9,025,244 B2 * | 5/2015 | Reimer | G02B 21/06 359/368 |
| 2005/0225851 A1 * | 10/2005 | Koerner | G02B 21/086 359/388 |
| 2013/0107279 A1 * | 5/2013 | Yamaguchi | G02B 21/08 250/492.1 |
| 2013/0113911 A1 | 5/2013 | Hanano et al. | |
| 2013/0284943 A1 | 10/2013 | Brukilacchio et al. | |
| 2015/0226930 A1 | 8/2015 | Ishigami et al. | |
| 2015/0330898 A1 | 11/2015 | Choi et al. | |
| 2015/0346474 A1 | 12/2015 | Iguchi | |
| 2020/0080142 A1 | 3/2020 | Lanlois et al. | |
| 2020/0383558 A1 | 12/2020 | Goebel et al. | |
| 2021/0247603 A1 | 8/2021 | Trulson et al. | |
| 2023/0116022 A1 | 4/2023 | Chen et al. | |

FOREIGN PATENT DOCUMENTS

| | | | |
|---|---|---|---|
| CN | 103097809 A | | 5/2013 |
| CN | 104614847 A | | 5/2015 |
| CN | 104737053 A | | 6/2015 |
| CN | 104813160 A | | 7/2015 |
| CN | 108095704 A | | 6/2018 |
| CN | 108351301 A | | 7/2018 |
| CN | 108535944 A | | 9/2018 |
| CN | 208506347 U | | 2/2019 |
| CN | 110234771 A | | 9/2019 |
| CN | 110967904 A | | 4/2020 |
| CN | 111257274 A | | 6/2020 |
| CN | 111624841 A | | 9/2020 |
| JP | 11-326773 | * | 11/1999 |
| WO | WO 00/41615 A1 | | 7/2000 |

OTHER PUBLICATIONS

PCT, International Preliminary Report on Patentability in counterpart International Patent Application No. PCT/CN2021/076825, mailed on Feb. 14, 2023.
CNIPA, First Office Action in counterpart Chinese Patent Application No. 202011582981.7, mailed on Oct. 17, 2022.
CNIPA, Second Office Action in counterpart Chinese Patent Application No. 202011582981.7, mailed on Mar. 11, 2023.
CNIPA, Notice of Allowance in counterpart Chinese Patent Application No. 202011582981.7, mailed on May 2, 2023.
CNIPA, Decision of Rejection in counterpart Chinese Patent Application No. 202011583924.0, mailed on Jul. 20, 2022.
CNIPA, First Office Action in counterpart Chinese Patent Application No. 202011583924.0, mailed on Jan. 14, 2022.
CNIPA, Second Office Action in counterpart Chinese Patent Application No. 202011583924.0, mailed on Feb. 22, 2022.
CNIPA, Third Office Action in counterpart Chinese Patent Application No. 202011583924.0, mailed on May 7, 2022.
CNIPA, Notice of Allowance in counterpart Chinese Patent Application No. 202011583924.0, mailed on Oct. 9, 2022.

* cited by examiner

LIGHT SOURCE APPARATUS, MICROSCOPIC DEVICE, OPTICAL DETECTION DEVICE AND OPTICAL DETECTION METHOD

CROSS-REFERENCE TO RELATED APPLICATIONS

This patent application is the U.S. National Stage of International Patent Application No. PCT/CN2021/076825, filed Feb. 19, 2021, which claims the benefit of Chinese patent for invention Application No. 202011582795.3 filed on Dec. 28, 2020, the Chinese patent for invention Application No. 202011582981.7 filed on Dec. 28, 2020, and the Chinese patent for invention Application No. 202011583924.0 filed on Dec. 28, 2020, which are each incorporated by reference herein in their entirety.

TECHNICAL FIELD

The present disclosure relates to the technical field of optical detection, and in particular, to a light source apparatus, a microscopic device, an optical detection device, and an optical detection method.

BACKGROUND

Optical detection is increasingly widely used in fields of chemistry, biology, and the like. In optical detection, illumination light may be used to illuminate a sample to observe the sample, such as counting of biological particles (e.g., cells) etc. in the sample, morphological observation, and the like. Excitation light having a certain wavelength may also be used to excite various signals (e.g., fluorescence signals, etc.) in the sample, thereby obtaining relevant properties of the sample. However, in the existing optical detection device, light source assemblies for illumination and excitation are usually separately arranged, resulting in a large volume of the optical detection device, and often requiring complicated switching between different light source assemblies, which brings much inconvenience to detection.

In optical detection, good illumination may help related personnel to better observe the sample, thereby obtaining more information about the sample in a simple manner. For example, in biological assays, relevant information about biological particles (e.g., cells, cell debris, yeast, algae, etc.) and their properties (e.g., distinguishing whether a cell is alive or dead, etc.) in a sample can be obtained with the aid of illumination. However, due to limitations of own conditions of the sample, such as the biological particles themselves being small and mostly transparent, their effective illumination is often very difficult.

In addition, when a sample under test is irradiated with excitation light having a certain wavelength to excite, for example, a fluorescence signal or the like, relevant properties of the sample under test can be obtained, thereby identifying and analyzing the sample under test (for example, biological particles such as cells, cell debris, yeast, algae, and the like). However, it may be possible to excite multiple signals at different bands in the same sample under test, and different signals may reflect different aspects of properties of the sample under test. In order to reduce mutual interference between these signals, it is necessary to separate them one by one through filters and the like, and then analyze each signal separately. Such detection processes are often very complex, and it is difficult to obtain more comprehensive information about the sample under test in a single detection, resulting in a less ideal detection effect.

SUMMARY

One of the objects of the present disclosure is to provide a light source apparatus, a microscopic device, an optical detection device, and an optical detection method.

According to a first aspect of the present disclosure, there is provided a light source apparatus comprising:
an illumination light source configured to generate illumination light; and a diaphragm disposed on an emergent light path of the illumination light source, comprising:
a light shielding screen configured to block part of the illumination light;
a first light-transmitting portion provided on the light shielding screen and covering a center of the diaphragm, the first light-transmitting portion being configured to make part of the illumination light transmit therethrough to form bright-field illumination; and
a second light-transmitting portion provided on the light shielding screen and located at a periphery of the first light-transmitting portion, the second light-transmitting portion being configured to make part of the illumination light transmit therethrough to form dark-field illumination.

According to a second aspect of the present disclosure, there is also provided a light source apparatus, comprising:
a first light source assembly configured to generate first emergent light propagating in a first direction;
a second light source assembly configured to generate second emergent light propagating in a second direction, wherein the second direction and the first direction intersect with each other; and
a first dichroscope disposed at a location where the first direction intersects the second direction, and configured to make at least part of the first emergent light transmit to continue propagating in the first direction, and to reflect at least part of the second emergent light to propagate in the first direction, wherein transmitted part of the first emergent light is in a first band, reflected part of the second emergent light is in a second band, and the first band and the second band are separated from each other.

According to a third aspect of the present disclosure, there is provided a microscopic device, comprising the light source apparatus as described above.

According to a fourth aspect of the present disclosure, there is provided an optical detection device comprising the light source apparatus as described above.

According to a fifth aspect of the present disclosure, there is provided an optical detection device comprising:
a light source apparatus configured to generate excitation light, at least part of the excitation light being capable of exciting a first light signal in a third band and a second light signal in a fourth band, wherein the third band and the fourth band are separated from each other, and a maximum wavelength of the third band is less than a minimum wavelength of the fourth band;
a second filter disposed on a light path where the first light signal and the second light signal are located, and configured to make light in the third band and the fourth band pass therethrough and filter out light in other bands; and a detection apparatus disposed on an emergent light path of the second filter, and configured to generate a detection signal in response to the first light signal and the second light signal.

According to a sixth aspect of the present disclosure, there is provided an optical detection method comprising:

exciting a sample under test with light in a fifth band, wherein the light in the fifth band is capable of exciting a first light signal in a third band and a second light signal in a fourth band, the third band and the fourth band are separated from each other, a maximum wavelength of the third band is less than a minimum wavelength of the fourth band, and a maximum wavelength of the fifth band is less than or equal to a minimum wavelength of the third band; and detecting the first light signal and the second light signal from the sample under test.

Other features of the present disclosure and advantages thereof will become apparent from the following detailed description of exemplary embodiments thereof with reference to the accompanying drawings.

BRIEF DESCRIPTION OF THE DRAWINGS

The accompanying drawings, which constitute part of this specification, describe embodiments of the present disclosure and, together with this specification, serve to explain the principles of the present disclosure.

The present disclosure may be more clearly understood from the following detailed description with reference to the accompanying drawings, in which.

Figure 1A:
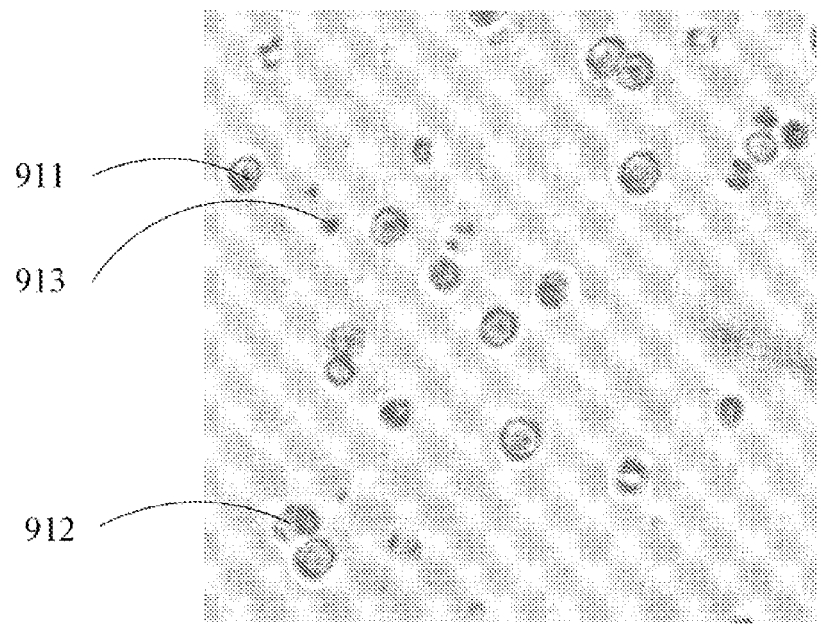
FIG. 1(a) shows an imaged photograph in bright-field illumination when unstained in a particular example.

Note that in the embodiments described below, sometimes same reference numerals are used in common between different drawings to denote same portions or portions having the same function, and a repetitive description thereof will be omitted. In this description, like reference numerals and letters are used to denote like items, and therefore, once an item is defined in one drawing, further discussion thereof is not required in subsequent drawings.

For convenience of understanding, positions, dimensions, ranges, and the like of the respective structures shown in the drawings and the like do not necessarily indicate actual positions, dimensions, ranges, and the like. Therefore, the disclosure is not limited to the positions, dimensions, ranges, and the like disclosed in the drawings and the like. Furthermore, the drawings are not necessarily drawn to scale, and some features may be exaggerated to show details of particular components.

DETAILED DESCRIPTION

Various exemplary embodiments of the present disclosure will now be described in detail with reference to the accompanying drawings. It should be noted that: relative arrangement of components and steps, numerical expressions and numerical values set forth in these embodiments do not limit the scope of the present disclosure unless specifically stated otherwise.

The following description of at least one exemplary embodiment is merely illustrative in nature and is in no way intended to limit the disclosure, its application, or use. That is, the method and the apparatus herein are shown by way of example to illustrate different embodiments of the apparatus or method in the present disclosure and are not intended to be limiting. Those skilled in the art will appreciate that they are merely illustrative of exemplary ways in which the disclosure may be practiced but not exhaustive.

Techniques, methods, and apparatus known to one of ordinary skill in the relevant art may not be discussed in detail, but should be regarded as part of the granted specification where appropriate.

In research process, for example in the biological field, in order to characterize a sample, sample illumination is generally involved. Related personnel can select a suitable illumination mode as needed to realize the illumination, and the illumination modes can include bright-field illumination, dark-field illumination and the like.

Figure 1B:
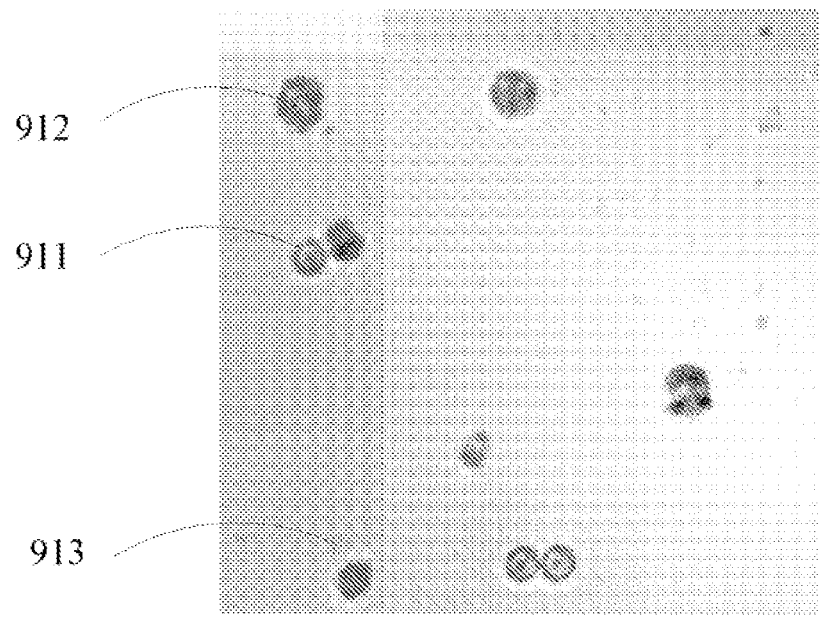
FIG. 1(b) shows an imaged photograph in bright-field illumination when stained with trypan blue in a particular example.

FIG. 1(a) shows an imaged photograph in bright-field illumination when unstained in a particular example, and FIG. 1(b) shows an imaged photograph in bright-field illumination when stained with trypan blue in a particular example. In the imaged photographs shown in FIGS. 1(a) and 1(b), objects 911, 912, 913 and the like exhibiting different morphologies can be seen, which may be living cells, dead cells, and other impurities etc. contained in the sample. However, in the case of bright-field illumination, different objects in the sample typically have focal planes that coincide with each other, and thus, it is difficult to effectively distinguish among different objects in such an imaged photograph. In addition, edges of transparent objects in the sample may not be clear, it may be difficult to estimate sizes, etc., of these transparent objects, and even some transparent objects may not be effectively observed.

Figure 2:
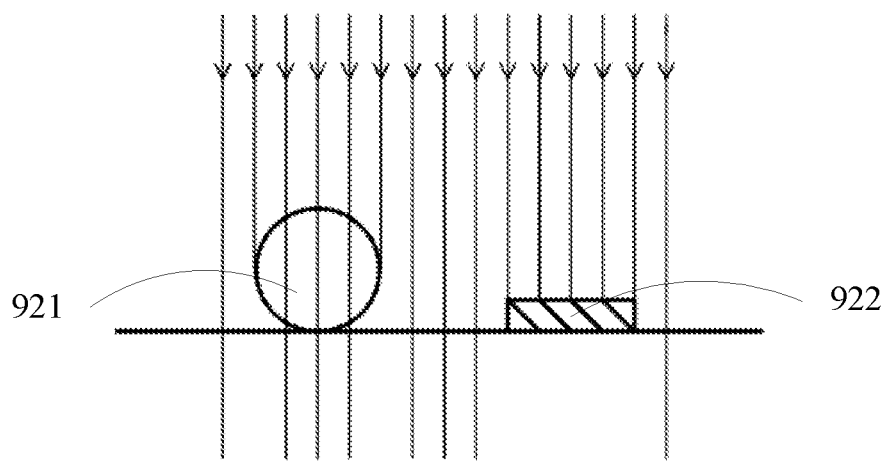
FIG. 2 shows a schematic diagram of an interaction between illumination light and a sample in the case of bright-field illumination in a particular example.

FIG. 2 shows a schematic diagram of an interaction between illumination light and a sample in the case of bright-field illumination. In the case of bright-field illumination, the illumination light is incident perpendicularly or substantially perpendicularly on the sample. When the illumination light is illuminated on a transparent object 921, it may substantially penetrate the transparent object 921; when the illumination light is illuminated on a non-transparent object 922, it is blocked by the non-transparent object 922. Thus, under bright-field illumination, transparent objects may be difficult to well appear in an imaged photograph, whereas non-transparent objects generally have a much better imaging effect than the transparent objects, which also explains the phenomenon observed in the imaged photograph shown in FIG. 1.

Figure 3A:
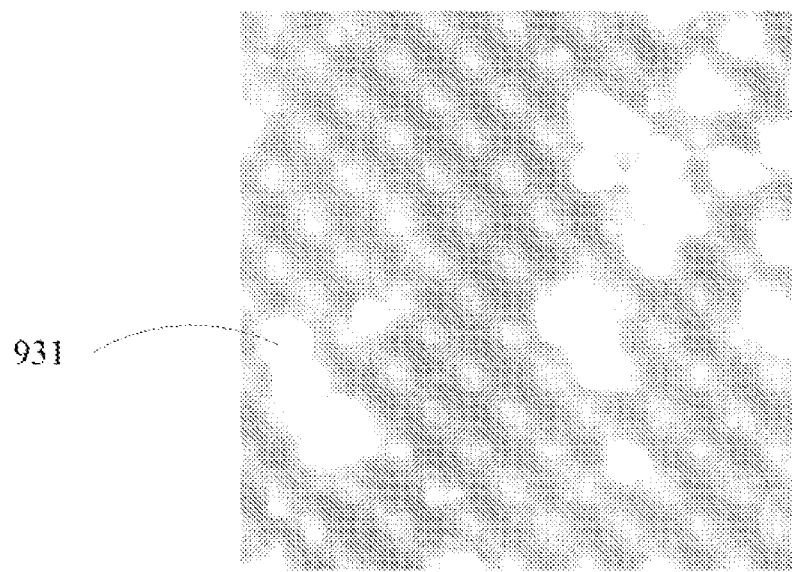
FIG. 3(a) shows an imaged photograph in dark-field illumination when unstained in a particular example.
Figure 3B:
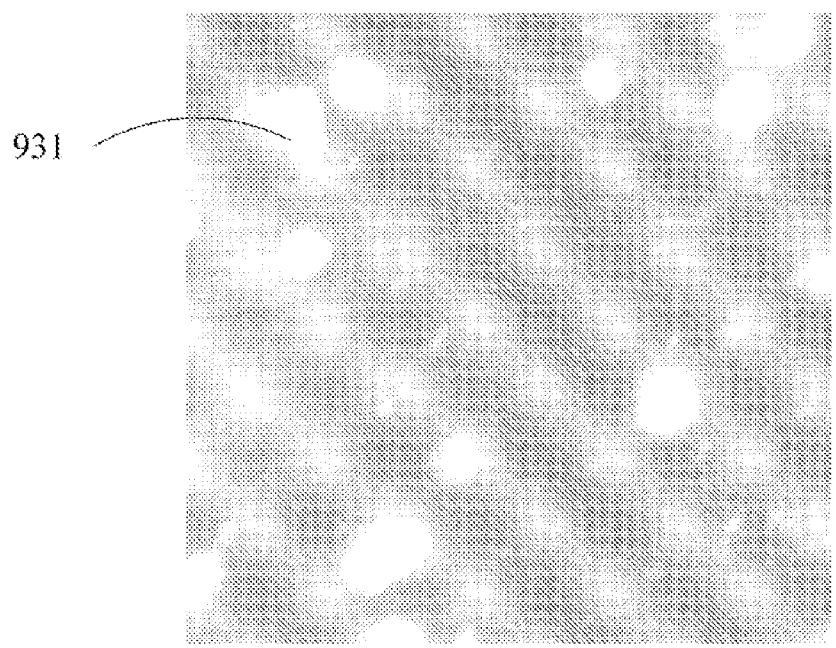
FIG. 3(b) shows an imaged photograph in dark-field illumination when stained with trypan blue in a particular example.

Imaging can also be performed in the case of dark-field illumination in order to facilitate observation of transparent objects. FIG. 3(a) shows an imaged photograph in dark-field illumination when unstained in a particular example, and FIG. 3(b) shows an imaged photograph in dark-field illumination when stained with trypan blue in a particular example, in which an object 931 is brighter. In the case of dark-field illumination, transparent objects can be better observed, including counting and size estimation of transparent objects such as living cells, etc. However, dark-field illumination is not conducive to the observation of non-transparent objects or stained objects (e.g., dead cells of nuclei stained by trypan blue, etc.), and thus it is difficult to grasp complete information about various objects contained in a sample.

Figure 4:
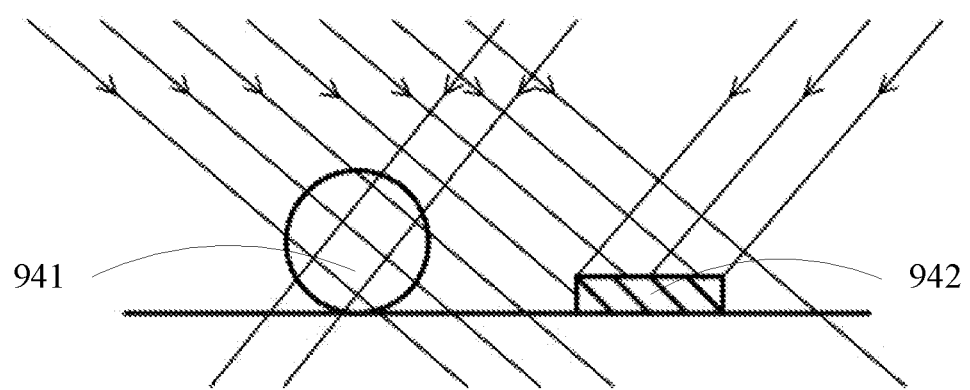
FIG. 4 shows a schematic diagram of an interaction between illumination light and a sample in the case of dark-field illumination in a particular example.

FIG. 4 shows a schematic diagram of an interaction between illumination light and a sample in the case of dark-field illumination. In the case of dark-field illumination, illumination light is incident on the sample at a large angle, and the illumination light can come from different directions. When the illumination light interacts with a transparent object 941 contained in the sample, illumination light from different directions will intersect at different locations of a surface on the transparent object 941, thereby better characterizing edges of the transparent object 941, and helping to clearly display the transparent object 941. However, when the illumination light is illuminated on a non-transparent object 942, it will be blocked by the non-transparent object 942, and for lack of background light in the dark-field condition, the observation of the non-transparent object 942 in the sample is relatively difficult.

In order to better observe various objects in a sample, in an exemplary embodiment of the present disclosure, a light source apparatus is proposed that combines bright-field illumination and dark-field illumination to produce composite illumination, thereby achieving a better illumination effect.

Figure 5:
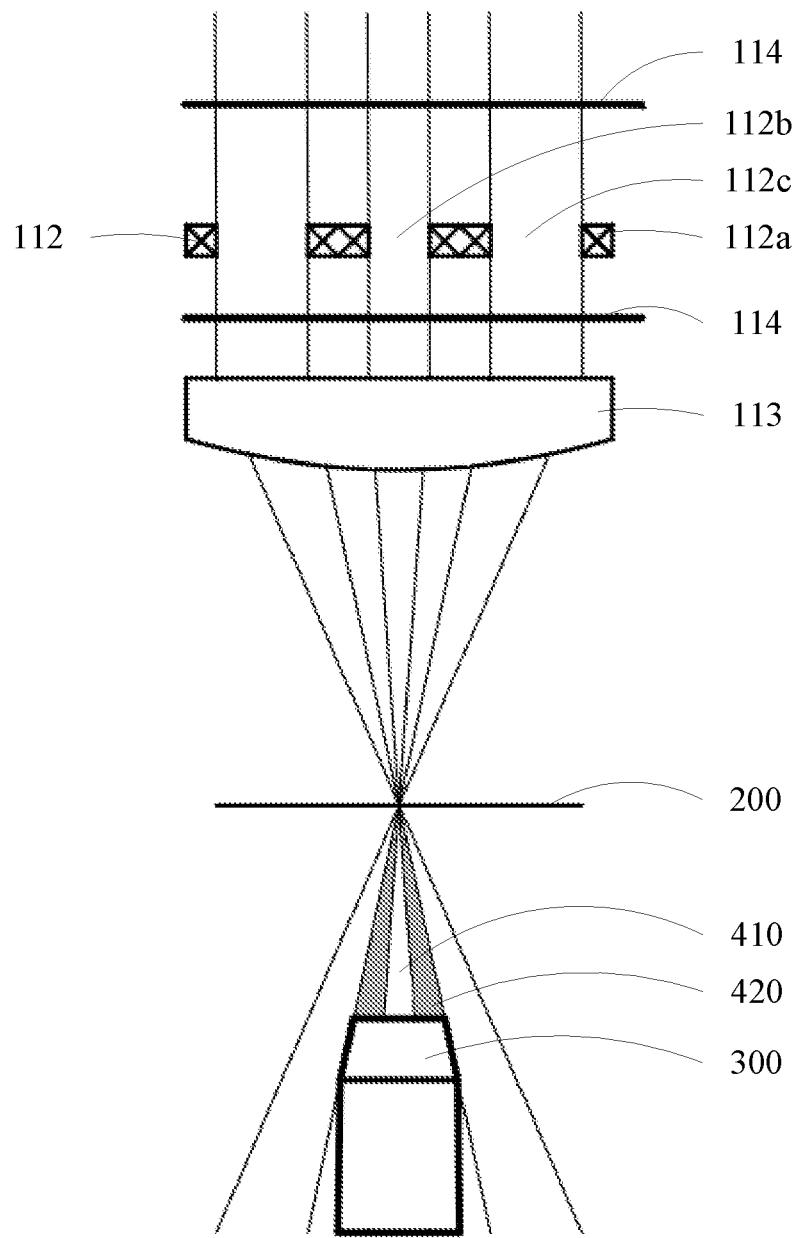
FIG. 5 shows a schematic structural diagram of a light source apparatus, a sample and an objective lens according to an exemplary embodiment of the present disclosure.
Figure 6:
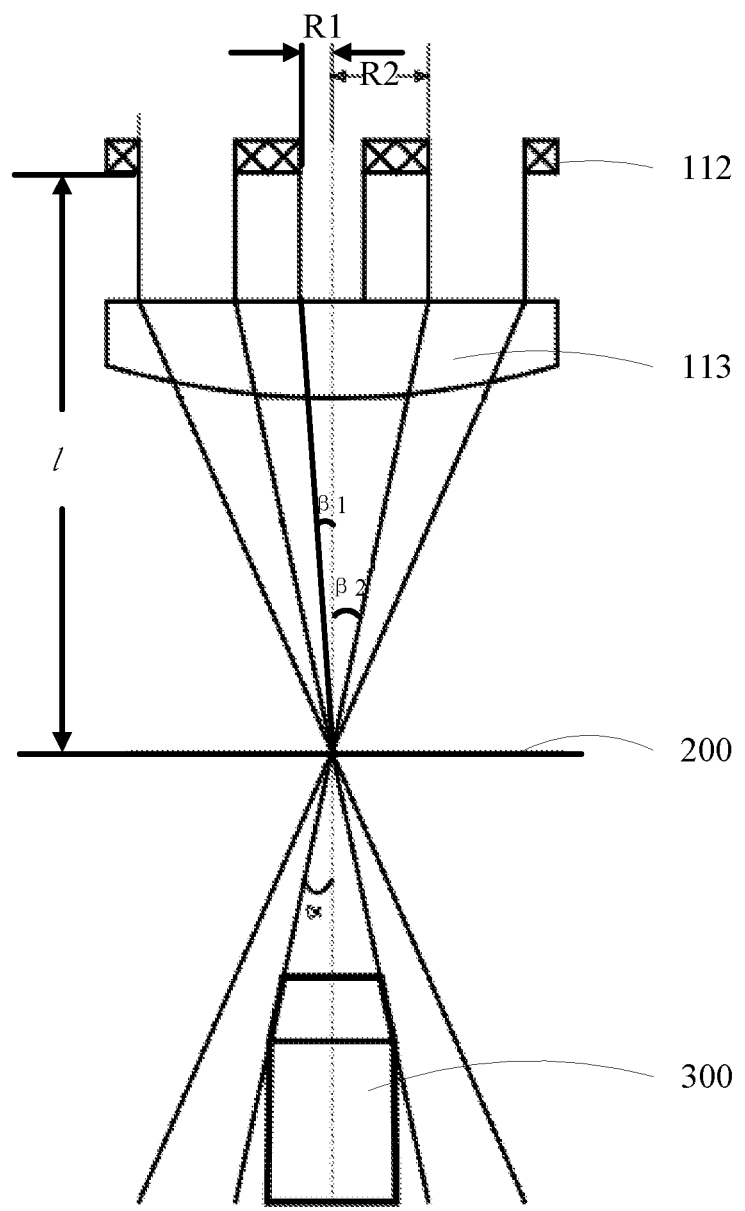
FIG. 6 is a schematic diagram showing relevant parameters in the light source apparatus, the sample and the objective lens in FIG. 5.

As shown in FIG. 5 and FIG. 6, in an exemplary embodiment of the present disclosure, the light source apparatus may include an illumination light source (not shown in the figures) and a diaphragm 112.

The illumination light source may be configured to generate illumination light, typically in a visible band. In some embodiments, the illumination light source may include at least one of a thermal radiation light source or a light emitting diode, to generate visible light, such as white light or near white light, to facilitate optical observation of the sample.

The diaphragm 112 is disposed on an emergent light path of the illumination light source, and can produce composite illumination at a sample position where a sample 200 is located by adjusting transmitted part of the illumination light. It can be understood that the diaphragm 112 may be disposed at different locations on the emergent light path of the illumination light source, to block the illumination light. However, in order to facilitate determination of light-passing parameters of the diaphragm 112 itself and a setting position of the diaphragm 112 along an optical axis, the diaphragm 112 may be disposed on a light path through which illumination light in a collimated state passes. When the illumination light directly generated by the illumination light source is not collimated light, a collimating lens provided integrally with the illumination light source or provided independently of the illumination light source may be further included in the light source apparatus. The collimating lens may include one or more lenses cooperating with each other to achieve collimation of the illumination light, and accordingly, the diaphragm 112 may be disposed on an emergent light path of the collimating lens.

The diaphragm 112 may include a light shielding screen 112a, a first light-transmitting portion 112b, and a second light-transmitting portion 112c. The light shielding screen 112a may be made of a non-transparent material and configured to block part of the illumination light. The first light-transmitting portion 112b is provided on the light shielding screen 112a, covers a center of the diaphragm 112, and is configured to make part of the illumination light transmit therethrough to form bright-field illumination. The second light-transmitting portion 112c is also provided on the light shielding screen 112a, is located at a periphery of the first light-transmitting portion 112b, and is configured to make part of the illumination light transmit therethrough to form dark-field illumination.

As shown in FIG. 5, when the illumination light incident on the sample 200 through the first light-transmitting portion 112b at a small angle interacts with the sample 200, part of direct light 410 (white area) close to an optical axis will be generated, which corresponds to bright-field illumination, and can enhance brightness of the entire observation field to improve the observation effect. When the illumination light incident on the sample 200 through the second light-transmitting portion 112c at a large angle interacts with the sample 200, scattered light 420 (gray area) relatively far from the optical axis will be generated, which corresponds to dark-field illumination, and can better display edges of transparent objects in the sample to improve the observation effect. Furthermore, as can be seen in FIG. 5, there may be part of the direct light 410 outside the scattered light 420, which will not be collected by an objective lens 300 by designing relevant parameters of the objective lens 300, and will not substantially affect the observation, and thus will not be described in detail.

In the light source apparatus, by adjusting relevant sizes of the first and second light-transmitting portions 112b and 112c, a ratio of bright-field illumination and dark-field illumination in the composite illumination may be changed to achieve a desired illumination effect. In particular, as the relative light-passing size of the first light-transmitting portion 112b increases, an amount of transmitted illumination light incident on the sample at a small angle increases, a proportion occupied by bright-field illumination increases, an observed field of view will be brighter, but the imaging effect of the transparent object may deteriorate; while as the relative light-passing size of the second light-transmitting portion 112c increases, an amount of transmitted illumination light incident on the sample at a large angle increases, a proportion occupied by dark-field illumination increases, the imaging effect of the transparent object will be better, but the imaging effect of a non-transparent object or a stained object or the like may deteriorate, and an overall brightness of the field of view will become lower.

FIG. 6 shows some relevant parameters in the light source apparatus, the sample and the objective lens, and by adjusting the relationship among them, a more desirable illumination effect can be obtained.

In some embodiments, to avoid an excessive proportion of bright-field illumination in composite imaging, the following relationship shall be generally satisfied:

$$\angle\beta 1 \le \frac{1}{3}\angle\alpha,$$

wherein $$\tan\beta = \frac{R1}{l}, \sin\alpha = n,$$

R1 is a distance between an outer edge of the first light-transmitting portion 112b and a center of the diaphragm 112, l is a distance between the diaphragm 112 and the sample position, and n is a numerical aperture of the objective lens 300 used cooperatively with the light source apparatus, and it can be derived: R1≤l·tg[arcsin(n)/3].

In some embodiments, in order to avoid the direct light near the outside from entering the objective lens 300 to interfere with the imaging, i.e. to enable the scattered light generated by the interaction with the sample to cover an aperture of the objective lens 300, the following relationship shall be generally satisfied: ∠β2>∠α, wherein $$\tan\beta = \frac{R2}{l}, \sin\alpha = n,$$

R2 is a distance between an inner edge of the second light-transmitting portion 112c and a center of the diaphragm 112, l is a distance between the diaphragm 112 and the sample position, and n is the numerical aperture of the objective lens 300 used cooperatively with the light source apparatus, and it can be derived:

$$R2 \ge l \cdot tg[\arcsin(n)].$$

In the light source apparatus, the light shielding screen 112a can block at least the illumination light incident on the sample at a small angle, thereby helping to form dark-field illumination and avoiding interference with the final imaging caused by the illumination light incident at a small angle.

Figure 7:
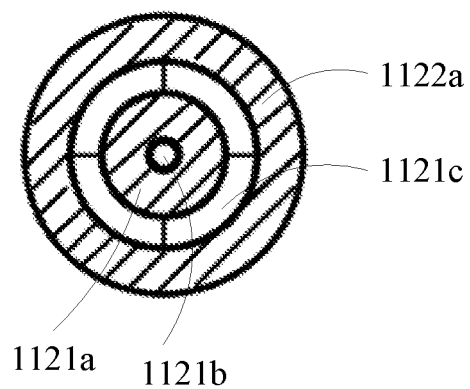
FIG. 7 shows a schematic structural diagram of a diaphragm in a particular embodiment.

The light shielding screen 112a may include a plurality of light shielding portions connected to each other. In some embodiments, the light shielding screen 112a may include an annular light shielding portion around the center of the diaphragm 112, to block part of the illumination light that is incident on the sample at a small angle, while allowing light that is incident perpendicularly and small part of light that is incident on the sample at a smaller angle to pass through, thereby achieving composite illumination combining dark-field illumination and bright-field illumination, such as a first annular light shielding portion 1121a shown in FIG. 7. In some cases, as shown in FIG. 7, the light shielding screen 112a may further include an outer second annular light shielding portion 1122a surrounding the first annular light shielding portion 1121a to further constrain illumination light beams. Of course, in some other diaphragms 112, the shape of the light shielding screen 112a may be irregular, such as the diaphragm shown in FIG. 8.

Figure 8:
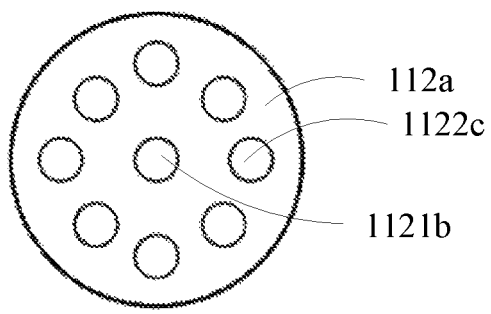
FIG. 8 shows a schematic structural diagram of a diaphragm in another particular embodiment.

The first light-transmitting portion 112b can make light having a small incident angle, closer to the optical axis transmit therethrough to form bright-field illumination in the composite illumination. In some embodiments, the first light-transmitting portion 112b may include a circular light-passing hole 1121b that is expanded outward from the center of the diaphragm 112 as shown in FIGS. 7 and 8. Of course, in other examples, the first light-transmitting portion 112b may have other shapes and arrangements.

The second light-transmitting portion 112c may make light having a large incident angle, farther from the optical axis transmit therethrough, to form dark-field illumination in the composite illumination. In some embodiments, the second light-transmitting portion 112c may include one or more light-passing slits arranged around the center of the diaphragm 112. These light-passing slits may include an arc-shaped light-passing slit 1121c, as shown in FIG. 7. In addition, a plurality of light-passing slits may be arranged annularly around the center of the diaphragm 112, so that large angles of incident light from various directions can transmit through the diaphragm 112 onto the sample, thereby helping to form dark-field illumination in the composite illumination. In some embodiments, the second light-transmitting portion 112c may include one or more light-passing holes arranged around the center of the diaphragm 112. These light-passing holes may include a circular light-passing hole 1122c, as shown in FIG. 8. Furthermore, a plurality of light-passing holes may be uniformly distributed around the center of the diaphragm 112, so that incident light from various directions at large angles can transmit through the diaphragm 112 onto the sample, thereby helping to form dark-field illumination in the composite illumination. Of course, in other examples, the second light-transmitting portion 112c may have other shapes and arrangements.

In some embodiments, the diaphragm 112 may further include an adjustable diaphragm, in which a light transmission range of at least one of the first light-transmitting portion 112b or the second light-transmitting portion 112c can be changed, so that a ratio between dark-field illumination and bright-field illumination in the composite illumination may be changed, so as to conveniently and flexibly adjust the imaging effect according to actual situations.

In some embodiments, as shown in FIGS. 5 and 6, the light source apparatus may further include a first lens 113, and the first lens 113 may be disposed on an emergent light path of the illumination light source and configured to converge the illumination light at the sample position.

As described above, in order to facilitate determination of relevant parameters of the diaphragm 112 and its position on the optical axis, the first lens 113 may be disposed between the diaphragm 112 and the sample position, that is, the collimated illumination light is modulated by the diaphragm 112 first and then the illumination light is converged by the first lens 113.

In some embodiments, as shown in FIGS. 5 and 6, the light source apparatus may further include a light attenuator 114, which may be disposed on the emergent light path of the illumination light source and configured to reduce brightness of the illumination light, to improve the effect of the composite illumination and to avoid excessive bright bright-field. The light attenuator 114 may be a ground glass sheet or polarizer, etc., and may be disposed at one or more locations between the illumination light source and the diaphragm 112 or between the diaphragm 112 and the first lens 113. To facilitate determination of the size and position of the light attenuator 114 on the optical axis, the light attenuator 114 may be located on a light path through which the emergent light in a collimated state passes.

In an exemplary embodiment of the present disclosure, by providing the diaphragm in the light source apparatus, the composite illumination combining dark-field illumination and bright-field illumination may be formed on the sample, and the transparent object may be more clearly displayed on the premise of ensuring the imaging brightness, so that both the transparent object and the non-transparent object can be well observed. Furthermore, since different objects (e.g. cells and impurities) present in the sample have different heights, they may be imaged on different focal planes respectively, when different objects are involved, a very good observation effect can be achieved only by adjusting a focal distance without the need to switch between different light source apparatuses for bright-field illumination and dark-field illumination respectively.

Figure 9A:
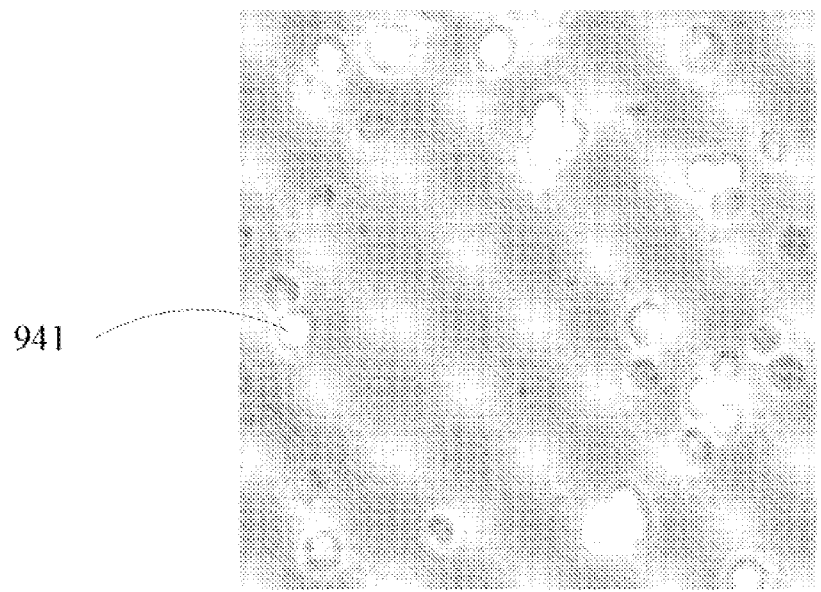
FIG. 9(a) shows an imaged photograph in composite illumination when unstained in a particular example.
Figure 9B:
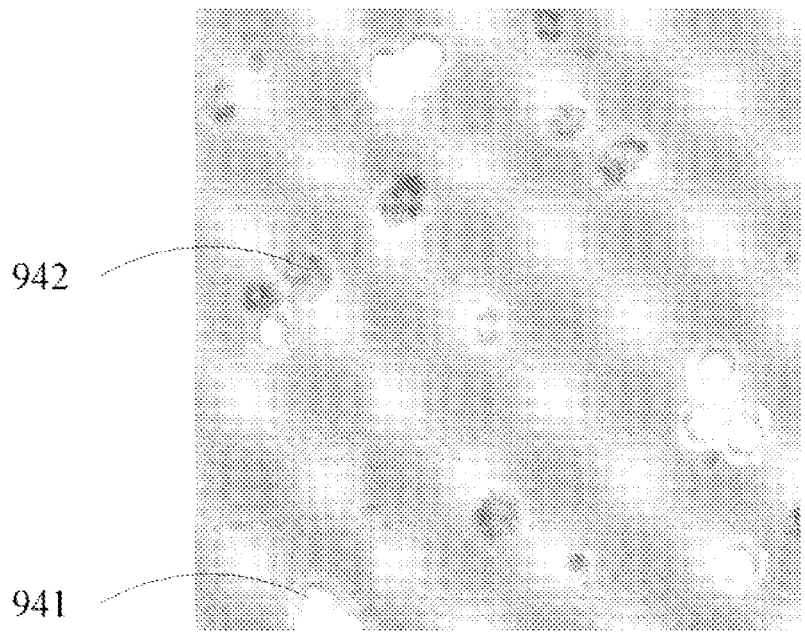
FIG. 9(b) shows an imaged photograph in composite illumination when stained with trypan blue in a particular example.

FIG. 9(*a*) shows an imaged photograph in composite illumination when unstained in a particular example, and FIG. 9(*b*) shows an imaged photograph in composite illumination when stained with trypan blue in a particular example. Especially when stained with trypan blue, transparent live cells 941 and dead cells 942 of nucleus stained with trypan blue can be clearly distinguished. In addition, a height difference between impurities and cells in the sample is large, so that a focal plane corresponding to the impurities is different from that corresponding to the cells, therefore, the interference of the impurities can be well removed when the cells are observed, and when the impurities need to be observed, it can be realized only by adjusting the focal distance.

In order to solve the problems of a large volume occupied by the light source assemblies in the optical detection device and inconvenient switching, the present disclosure further provides a light source apparatus which can integrate a plurality of light source assemblies so as to respectively achieve different detection functions in the optical detection device. The light source apparatus and a device using the light source apparatus of the present disclosure can have small volumes, and switching of the light path is simple, so that the detection is more convenient and efficient.

Figure 10:
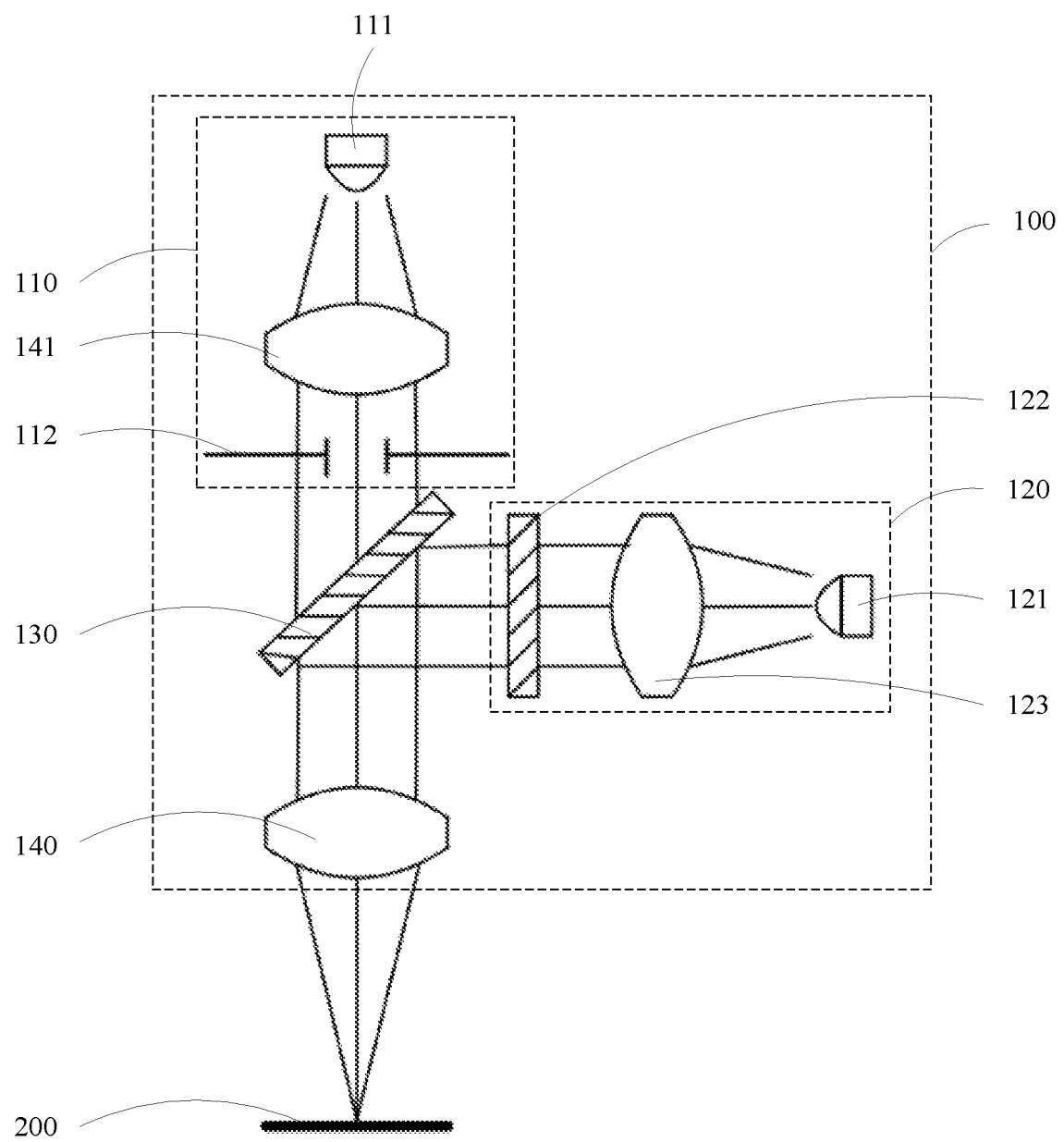
FIG. 10 shows a schematic structural diagram of a light source apparatus and a sample stage according to an exemplary embodiment of the present disclosure.
Figure 11:
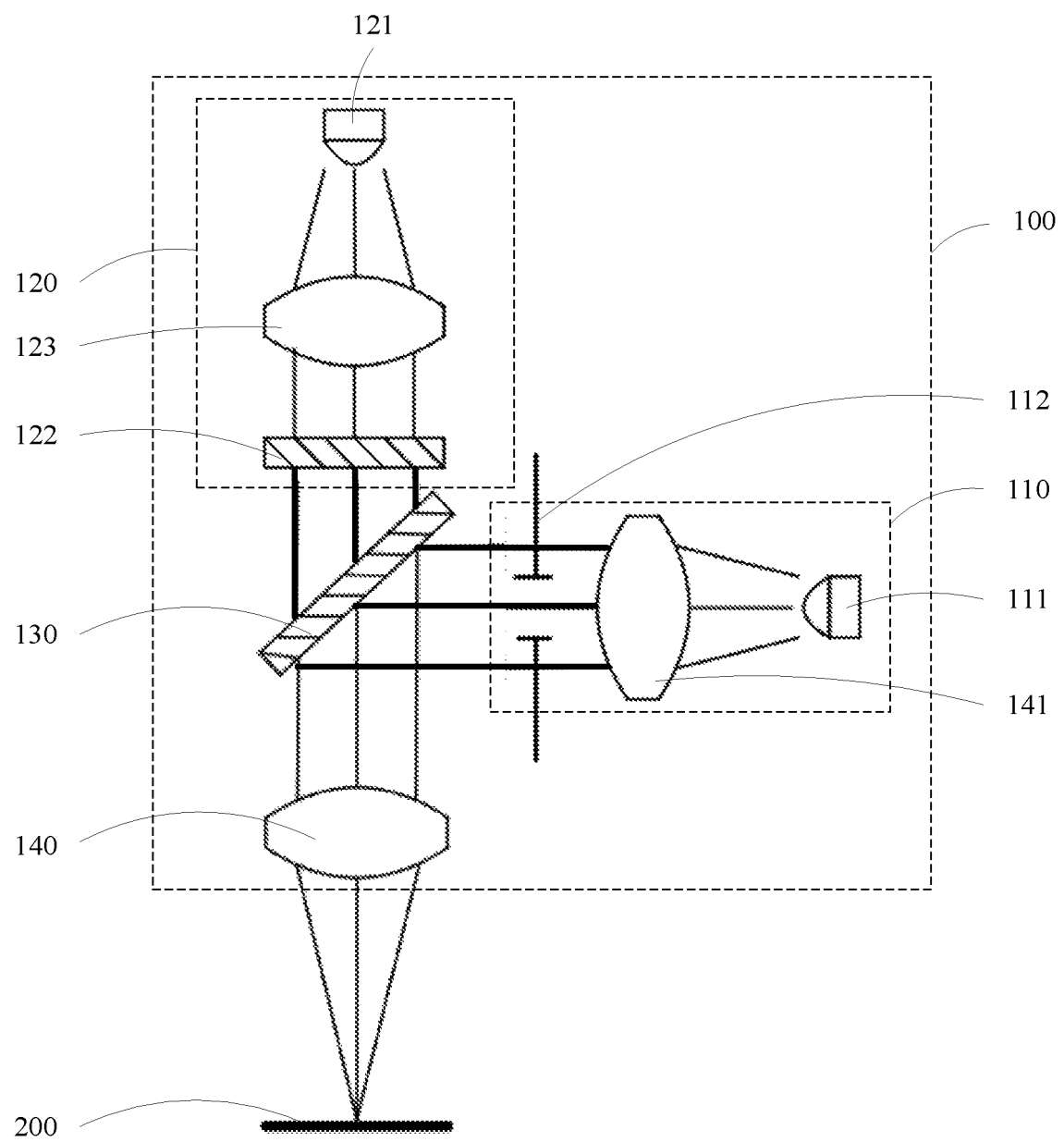
FIG. 11 shows a schematic structural diagram of a light source apparatus and a sample stage according to another exemplary embodiment of the present disclosure.

In an exemplary embodiment of the present disclosure, as shown in FIGS. 10 and 11, a light source apparatus 100 may include a first light source assembly configured to generate first emergent light propagating in a first direction, a second light source assembly configured to generate second emergent light propagating in a second direction, and a first dichroscope 130.

The second direction and the first direction intersect each other, so that the first light source assembly and the second light source assembly can be respectively disposed at different locations to avoid mutual interference therebetween.

Further, the first dichroscope 130 may make light of different wavelengths be transmitted or be reflected, so that the first emergent light and the second emergent light may share part of the light path, to reduce the volume of the light source apparatus, and to simplify switching between different light source assemblies.

The first dichroscope 130 may be disposed at a location where the first direction and the second direction intersect, so that both the first emergent light and the second emergent light may be incident on the first dichroscope 130. The first dichroscope 130 may make at least part of the first emergent light transmit therethrough to continue propagating in the first direction and reflect at least part of the second emergent light to propagate in the first direction. That is, after passing through the first dichroscope 130, the first emergent light and the second emergent light will travel along the same light path.

In some embodiments, the first emergent light generated by the first light source assembly is in a band such that it can fully transmit through the first dichroscope 130. In some other embodiments, the band in which the first emergent light is located may be wider, and only part of the first emergent light in the band may pass through the first dichroscope 130, in this case, the first dichroscope 130 may also have a certain filtering function, so as to reduce a requirement for the band in which the first emergent light generated by the first light source assembly is located, which is helpful for reducing the cost of the first light source assembly. Similarly, the second emergent light generated by the second light source assembly is in a band such that it can be totally reflected by the first dichroscope 130. In some other embodiments, the band in which the second emergent light is located may be wider, and only part of the second emergent light in the band may be reflected by the first dichroscope 130, in this case, the first dichroscope 130 may also have a certain filtering function, so as to reduce a requirement for the band in which the second emergent light generated by the second light source assembly is located, which is helpful for reducing the cost of the second light source assembly. In addition, some first dichroscopes may make light having a larger wavelength transmit therethrough and reflect light having a smaller wavelength, and some other first dichroscopes may reflect light having a larger wavelength and make light having a smaller wavelength transmit therethrough, and the two kinds of different first dichroscopes may be selected as needed to be used in the light source apparatus. Based on basic properties of the first dichroscope 130, the transmitted part of the first emergent light is in the first band, the reflected part of the second emergent light is in the second band, and the first band and the second band may be separated from each other.

In an exemplary embodiment shown in FIG. 10, the first emergent light is illumination light for visual observation, the first light source assembly is an illumination light source assembly 110, and the second emergent light is excitation light for exciting a fluorescence signal or the like in a sample, and the second light source assembly is an excitation light source assembly 120. In an exemplary embodiment shown in FIG. 11, the first emergent light is excitation light, the first light source assembly is the excitation light source assembly 120, the second emergent light is illumination light, and the second light source assembly is the illumination light source assembly 110. The illumination light is typically in a visible band and may be, for example, white light. The band of the excitation light can be determined according to the properties of the sample or a reagent for staining the sample. In some embodiments, the excitation light can be in an ultraviolet band with relatively high energy or a relatively blue light band in visible light, for example, the band of the excitation light can be in a range of 450~500 nm.

As shown in FIGS. 10 and 11, the illumination light source assembly 110 may include the illumination light source 111 and the diaphragm 112 disposed between the illumination light source 111 and the first dichroscope 130. In addition, the illumination light source assembly 110 may further include the second lens 141 disposed between the illumination light source 111 and the diaphragm 112.

In some embodiments, the illumination light source 111 may include at least one of a thermal radiation light source or a light emitting diode. The illumination light source 111 may, for example, generate white light or visible light near white light, to facilitate optical observation of the sample.

The second lens 141 may collimate the light generated by the illumination light source 111. In some embodiments, the second lens 141 may include only one converging lens, to converge divergent light from the illumination light source 111 into parallel light or near parallel light. In some other embodiments, the second lens 141 may also include a plurality of lenses to collimate the light generated by the illumination light source 111.

The diaphragm 112 may block at least part of the light generated by the illumination light source 111, to improve illumination spot at the sample position (sample 200). The diaphragm 112 can have many different forms.

Figure 12:
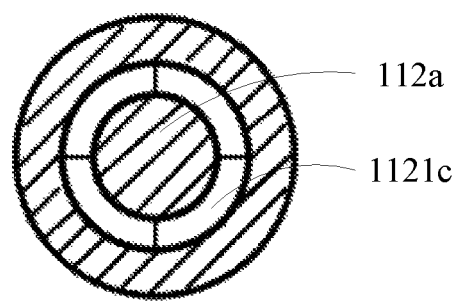
FIG. 12 shows a schematic structural diagram of a diaphragm according to yet another particular embodiment of the present disclosure.

In addition to the diaphragm 112 described above with reference to FIGS. 7 and 8, in some embodiments, the diaphragm 112, as shown in FIG. 12, may include a light shielding screen 112a and light-passing slits 1121c provided on the light shielding screen 112a, wherein the light-passing slits 1121c are distributed annularly around a central location of the light shielding screen 112a.

Figure 13:
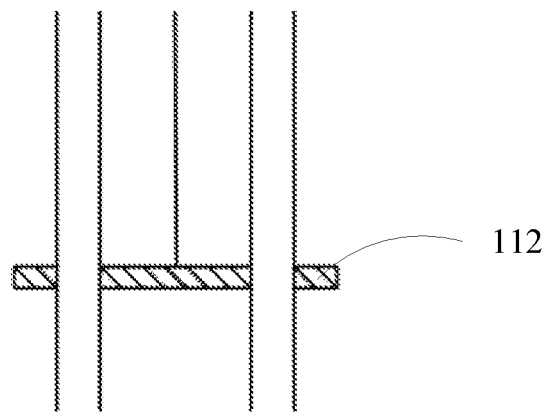
FIG. 13 shows a schematic diagram of a light path through the diaphragm in FIG. 12.

FIG. 13 shows a schematic diagram of a light path through the diaphragm in FIG. 12. It follows that at least a central part of the illumination light will be blocked by the diaphragm. Such diaphragm can form phase contrast, and especially when a transparent object (e.g., biological particles such as cells) is observed, edges of the transparent object can be clearer by adopting the phase contrast principle, thereby improving the observation effect.

As described above, in some embodiments, the diaphragm 112 may include an adjustable diaphragm in which open and close of at least partial light-passing holes and/or light-passing slits may be controlled to change, thereby changing an amount of light passing through the diaphragm 112. In some embodiments, the adjustable diaphragm may also be fully closed, to block the continued propagation of the illumination light when the illumination light is not needed, thereby avoiding a reduced lifetime thereof due to repeatedly switching on and off of the illumination light source 111.

As shown in FIGS. 10 and 11, the excitation light source assembly 120 may include an excitation light source 121 and a first filter 122 disposed between the excitation light source 121 and the first dichroscope 130. In addition, the excitation light source assembly 120 may further include a third lens 123 disposed between the excitation light source 121 and the first filter 122.

In the excitation process, there is usually a certain requirement for the wavelength of the excitation light, so that the energy of the excitation light is sufficient to excite a signal such as fluorescence of the sample. The excitation light source may include at least one of a light emitting diode or a laser. In a particular example, a band of the light generated by the excitation light source may be included in 450~500 nm, and in combination with a corresponding dye to stain the biological particles such as cells, such excitation light may excite the fluorescence signal of 500~550 nm or 600~650 nm, for example.

The first filter 122 can filter the light generated by the excitation light source, to obtain a second emergent light in a desired band. In some embodiments, the first filter 122 may include a band pass filter. The bandpass filter may allow light in a certain continuous wavelength range to pass through, while filtering out light of other wavelengths outside this range.

The third lens 123 may collimate the light generated by the excitation light source 121. Like the second lens 141, the third lens 123 may include only one converging lens, to converge divergent light from the excitation light source 121 into parallel light or near parallel light. Alternatively, the third lens 123 may also include a plurality of lenses to collimate the light generated by the excitation light source 121.

The first filter 122 is disposed at an emission end of the third lens 123 so as to filter the collimated excitation light, which helps to reduce the required size of the first filter 122.

As shown in FIGS. 10 and 11, the first direction and the second direction may be perpendicular to each other. Also, the first dichroscope 130 may be disposed such that incident angles of the first and second emergent light with respect to the first dichroscope 130 are both 45 degrees, thereby guiding both the first and second emergent light in the first direction, to illuminate or excite the sample.

A band of the excitation light may be in the range of 450~500 nm, and the cutoff wavelength of the first dichroscope 130 may be 550 nm. In a particular embodiment, as shown in FIG. 10, the first dichroscope 130 may transmit light having a wavelength above 550 nm, thereby enabling the illumination light to continue propagating in the first direction to the sample position, and reflect light having a wavelength below 550 nm, thereby reflecting the excitation light to propagate in the first direction to excite the sample. In another particular embodiment, as shown in FIG. 11, the first dichroscope 130 may reflect light having a wavelength above 550 nm, thereby reflecting the excitation light to propagate in the first direction to excite the sample, while transmit light having a wavelength below 550 nm, thereby enabling the illumination light to continue propagating in the first direction to the sample position.

As shown in FIGS. 10 and 11, in order to converge the parallel light or near parallel light emitted from the first dichroscope 130 to the sample position (sample 200), to improve illumination or excitation of the sample, the light source apparatus may further include a fourth lens 140 that may be disposed between the first dichroscope 130 and the sample position.

In optical detection processes, the illumination light and the excitation light are generally not projected onto the sample at the same time. In some embodiments, which light is to be projected onto the sample can be controlled by controlling the switches of the illumination light source 111 and the excitation light source 121, respectively. In some other embodiments, a component such as a diaphragm, a shutter, or the like may be provided on at least one of the light paths of the illumination light or the excitation light, to control on/off of the illumination light and the excitation light.

According to another aspect of the present disclosure, there is provided a microscopic device that may include the light source apparatus as described above. Further, in the microscopic device, a sample stage for holding a sample, and an objective lens, an imaging lens, an imaging apparatus (e.g., CCD, CMOS, etc.) and the like disposed opposite to the light source apparatus with respect to the sample position may be further included. The illumination light generated by the light source apparatus can be projected on the sample at the sample stage to realize the observation of the sample.

According to yet another aspect of the present disclosure, there is also provided an optical detection device that may include the light source apparatus or the microscopic device as described above. Furthermore, the optical detection device may further include a memory, a processor or the like, to automatically process and store the imaged image information or the like, so as to simplify the detection.

Figure 14:
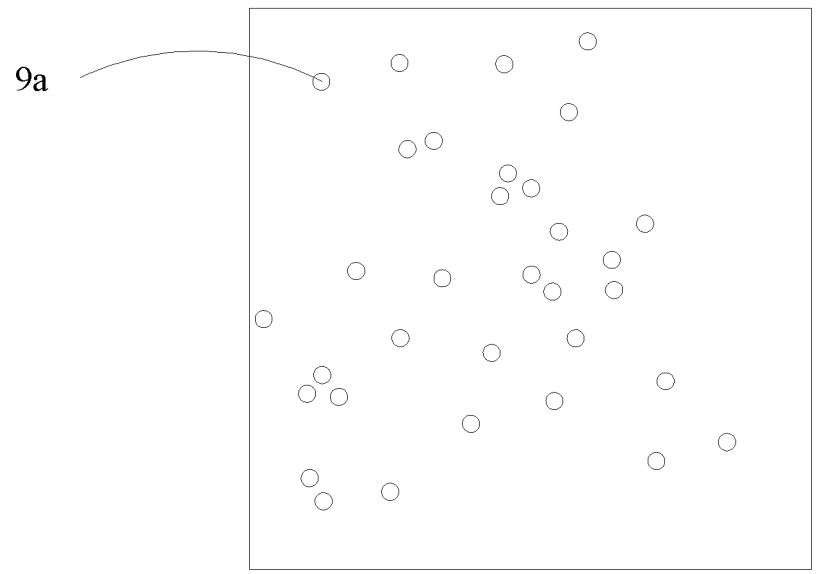
FIG. 14 shows an schematic imaging diagram of a first light signal in a third band excited from a sample under test.
Figure 15:
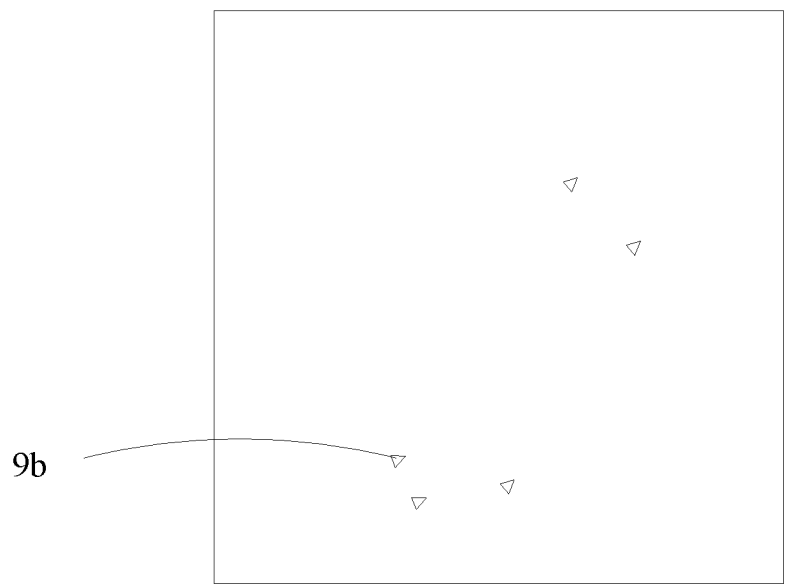
FIG. 15 shows a schematic imaging diagram of a second light signal in a fourth band excited from a sample under test.

Further, in optical detection, samples under test, such as biological particles, of different kinds and in different states, themselves or in combination with corresponding dyes, can be excited to emit different signals, such as fluorescence, and thus by detecting excitation light from the samples under test, relevant information can be obtained. The detection of the excitation light of individual band is generally performed separately, and a filter may be used to filter out light of other bands in the excitation light from the sample under test, and to leave light of one band desired to be detected only, so as to facilitate the analysis. As shown in FIGS. 14 and 15, which are schematic imaging diagrams of a first light signal in a third band and a second light signal in a fourth band excited from a sample under test, respectively, in FIG. 14, a first imaging spot 9a corresponding to the first light signal in the third band can be seen, and in FIG. 15, a second imaging spot 9b corresponding to the second light signal in the fourth band can be seen. It should be noted that an image formed from the light signal is typically a dark-field image, i.e., the image background is dark, while in FIGS. 14 and 15 and the following FIG. 18, the background of the imaged image is adjusted to be light for clarity of illustration.

However, for the same sample under test, the above detection method often involves multiple detections for various bands, and information about the sample under test obtained in each detection is very limited, resulting in an unsatisfactory detection effect.

In order to solve the above problem, the present disclosure provides an optical detection device and an optical detection method, and in an exemplary embodiment of the present disclosure, a plurality of light signals in a plurality of bands, which are excited from the sample under test, may be simultaneously analyzed, thereby improving the detection effect.

Figure 16:
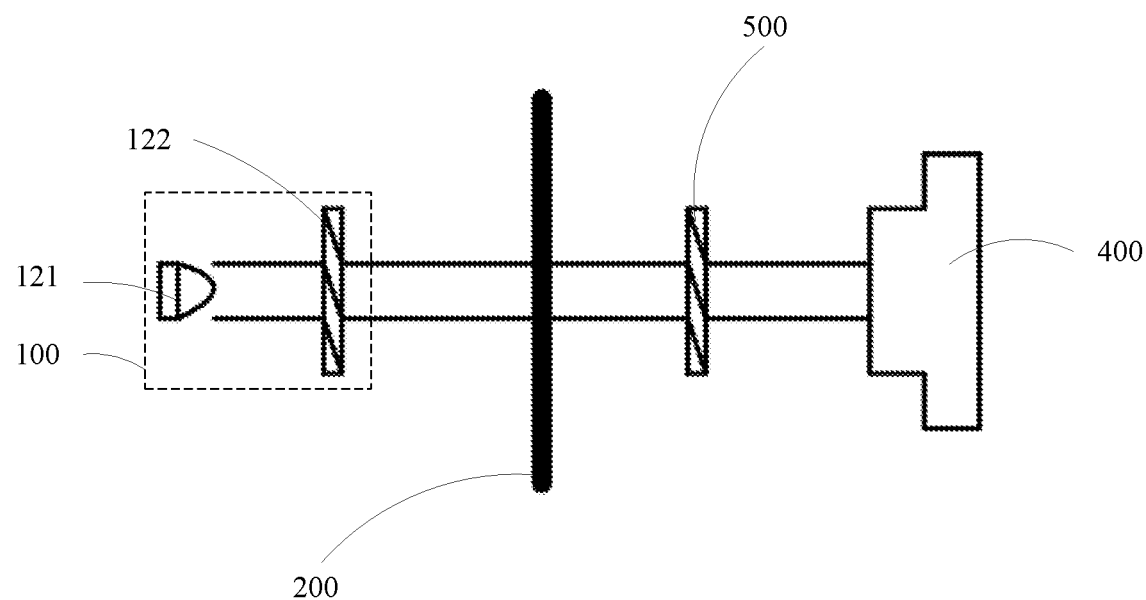
FIG. 16 shows a schematic structural diagram of an optical detection device according to an exemplary embodiment of the present disclosure.

In an exemplary embodiment of the present disclosure, as shown in FIG. 16, the optical detection device may include a light source apparatus 100 configured to generate excitation light for exciting a sample 200 under test, a second filter 500 configured to filter a first light signal in a third band and a second light signal in a fourth band from light signals generated by the sample 200 under test, and a detection apparatus 400 configured to generate a detection signal in response to the first light signal and the second light signal.

In particular, in a case where the sample under test meets the condition, at least part of the excitation light generated by the light source apparatus 100 may excite the first light signal in the third band and the second light signal in the fourth band. For the convenience of subsequent analysis, the third band and the fourth band are separated from each other, and here the excitation light in the third band with higher energy is taken as the first light signal, and the excitation light in the fourth band with lower energy is taken as the second light signal, for the convenience of the following description. It is understood that the energy of at least part of the excitation light may be greater than or equal to that of the first light signal, thereby enabling excitation of the first and second light signals.

The light source apparatus 100 may have various configurations. For example, as shown in FIG. 16, the light source apparatus 100 may include one or more excitation light sources 121, which may be at least one of a thermal radiation light source, a light emitting diode, or a laser. It will be appreciated that the light generated by the thermal radiation light source and the light emitting diode is generally distributed over a wide range of wavelengths, and thus when the light generated by the thermal radiation light source and the light emitting diode is used to excite a sample under test, the first filter 122 may also be provided in the light source apparatus 100, to filter the light directly generated by the thermal radiation light source and the light emitting diode to obtain light in a desired band. The light generated by the laser generally has good monochromaticity, thus in some cases, the light generated by the laser can be used for exciting a sample under test directly without providing a corresponding first filter, and certainly, in some other cases, the first filter can also be provided for the laser to filter out light of other wavelengths which may exist.

The first filter 122 may be disposed between the excitation light source 121 and a sample position for placing the sample 200 under test, and configured to make light in a fifth band of the excitation light pass therethrough and filter out light of other bands in the excitation light. In some embodiments, the first filter 122 may include a bandpass filter that may allow light in a certain continuous wavelength range to pass through, while filtering out light of other wavelengths outside this range. The light of the fifth band obtained through the first filter 122 can excite the sample under test. It can be understood that, in order to make the energy of the light in the fifth band greater than or equal to that of the light in the third band and the fourth band, so as to realize excitation, a maximum wavelength of the fifth band is less than or equal to a minimum wavelength of the third band. In a particular embodiment, the third band may be included in the range of 500~550 nm, the fourth band may be included in the range of 600~650 nm, and the fifth band may be included in the range of 450~500 nm.

Further, in the optical detection, optical observation of the sample under test is also generally involved. When light generated by an excitation light source or the like for excitation in the light source apparatus 100 is not suitable for optical observation, an illumination light source or the like for illuminating the sample under test may also be provided in the light source apparatus 100. The particular arrangement of the light source apparatus 100 may refer to the above description about the light source apparatus.

Furthermore, in some embodiments, the light path associated with the excitation light source 121 and the light path associated with the illumination light source 111 may also be separately arranged, that is, the excitation light and the illumination light may be illuminated onto the sample 200 under test along different light paths, respectively. In the optical detection device, a corresponding mechanical switching means or the like may be provided to switch the excitation light sources 121 and the illumination light sources 111.

Of course, in some embodiments, at least part of the light generated by the excitation light source for excitation may also be used directly to observe the sample under test.

Returning to FIG. 16, in the optical detection device, the second filter 500 may be disposed on a light path where the first light signal and the second light signal are located, and be configured to make light in the third band and the fourth band pass through and filter out light in other bands. That is, the second filter 500 is a multiband filter that can make light in at least two separated bands pass through, to realize multiband detection of the light excited from the sample under test, thereby obtaining more comprehensive information on the sample under test and simplifying a detection process. The second filter 500 capable of filtering to obtain light of a desired band may be selected according to relevant properties of the sample under test or a dye used to dye the sample under test.

It will be appreciated that in some other embodiments, the second filter 500 may also be selected to make light in three or more separated bands transmit through, thereby allowing simultaneous detection of more bands.

Figure 17:
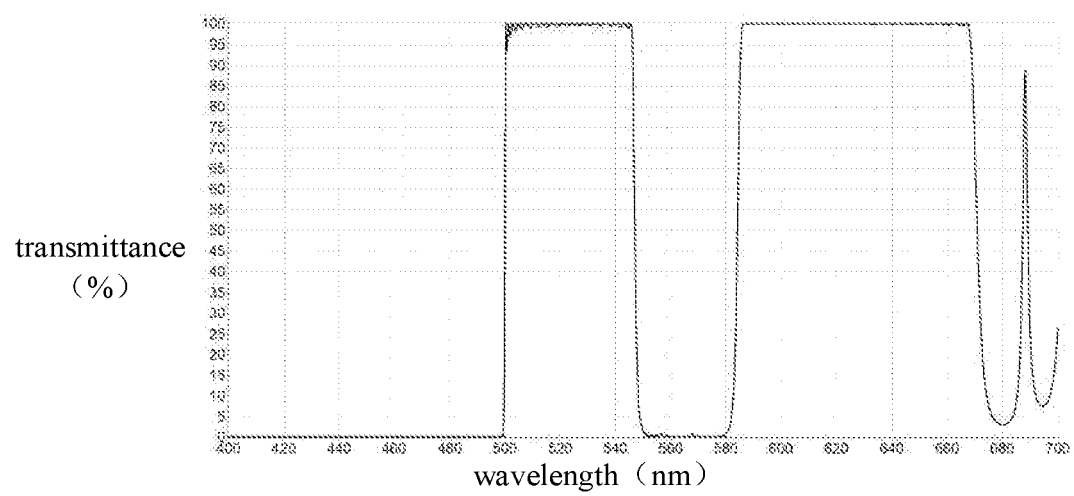
FIG. 17 shows a schematic diagram showing transmittance versus wavelength of a second filter in a particular embodiment.

FIG. 17 shows a schematic diagram of transmittance versus wavelength of a kind of second filter 500. It can be seen that the second filter 500 is capable of making light having wavelengths in bands of about 500~550 nm and 585~670 nm transmit through, while substantially filtering out light of other bands to improve the detection effect. In addition, in FIG. 17, there is a very narrow transmittance peak at approximately 690 nm, that is, this second filter 500 may make part of light having a wavelength around 690 nm pass through. However, in practical measurements, light signals in the band of 500~650 nm is of primary interest, thus the effect of light of 690 nm that may be present is negligible.

Figure 18:
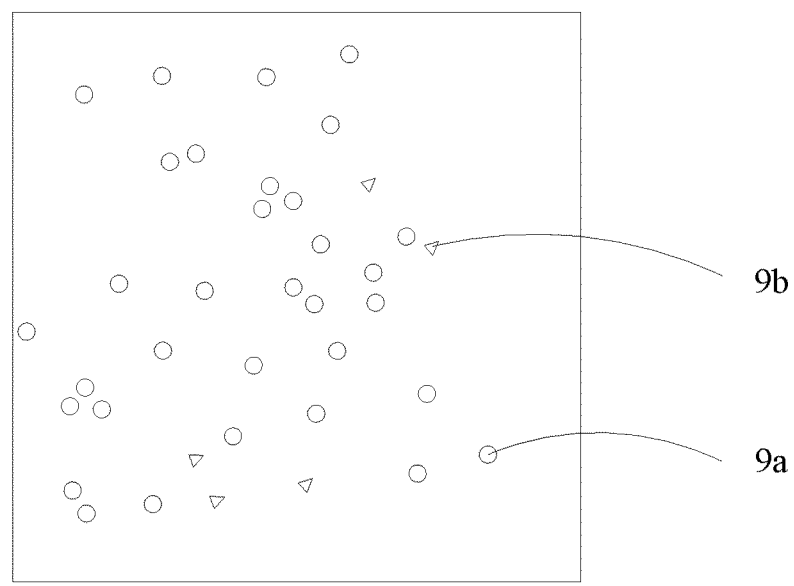
FIG. 18 shows a schematic imaging diagram of a first light signal in a third band and a second light signal in a fourth band excited from a sample under test in a particular embodiment.

FIG. 18 shows an schematic imaging diagram of a first light signal in a third band and a second light signal in a fourth band excited from a sample under test in a particular embodiment. Unlike FIGS. 14 and 15, in the schematic imaging diagram shown in FIG. 18, both the first imaging spot 9*a* corresponding to the first light signal in the third band and the second imaging spot 9*b* corresponding to the second light signal in the fourth band can be seen, so that more comprehensive information about the sample under test can be obtained.

As shown in FIG. 16, the optical detection device may further include a detection apparatus 400, which may be disposed on an emergent light path of the second filter 500 and be configured to generate a detection signal in response to the first light signal and the second light signal. In some embodiments, the detection apparatus 400 may include an imaging apparatus configured to image based on the first light signal and the second light signal, and the schematic imaging diagram shown in FIG. 18 may be formed on the imaging apparatus. Of course, in some other embodiments, the detection signal may have other forms.

In some embodiments, the imaging apparatus may include an objective lens assembly and an imaging lens assembly. The imaging lens assembly may be disposed at an emission end of the objective lens assembly, so that parallel or near parallel beams from the objective lens assembly can be imaged at a limited distance imaging location.

The imaging apparatus may further include at least one of a charge-coupled device or a complementary metal oxide semiconductor device, which may be disposed at a focal plane of the imaging lens assembly, to convert light signals from the sample under test passing through the objective lens assembly and the imaging lens assembly into electrical signals to form an imaged image.

In some embodiments, in order to make the structure more compact, the optical detection device may further include a turning apparatus disposed between the light source apparatus 100 and the detection apparatus 400, to change the propagation direction of light, making full use of space.

Figure 19:
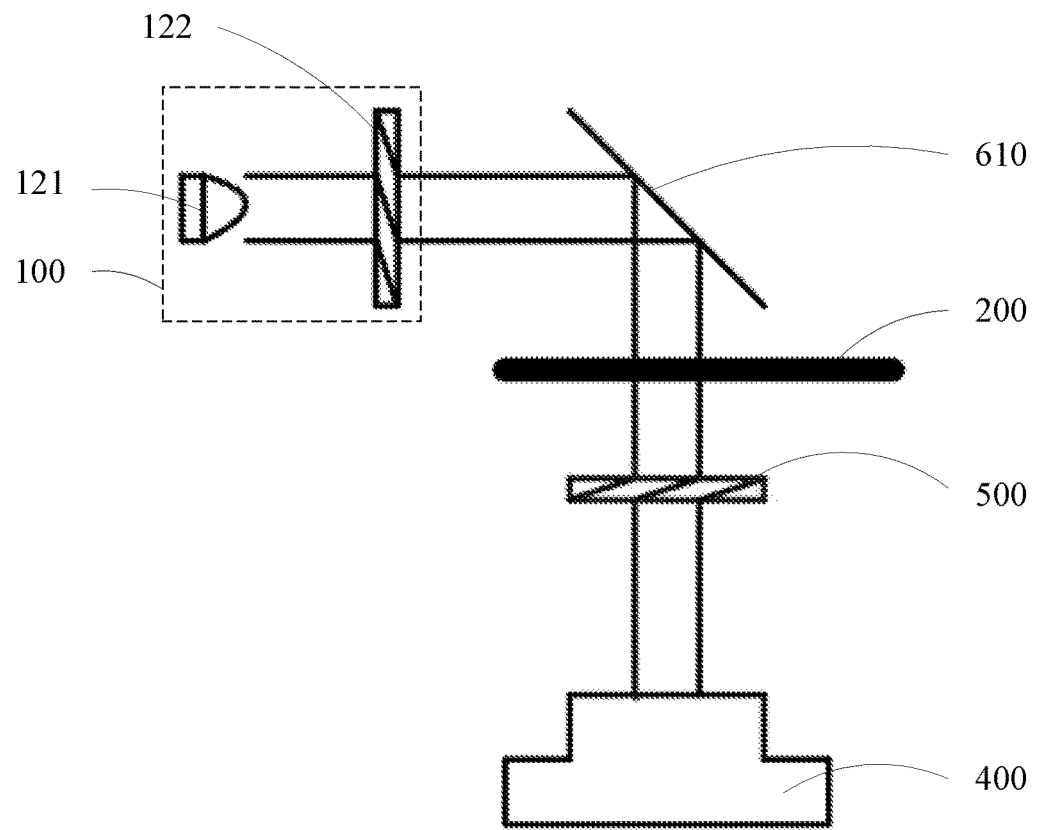
FIG. 19 shows a schematic structural diagram of an optical detection device according to another exemplary embodiment of the present disclosure.

In another exemplary embodiment of the present disclosure, as shown in FIG. 19, the turning apparatus may include a mirror 610. The mirror 610 may be disposed between the light source apparatus 100 and a sample position where the sample 200 under test is located, and the mirror 610 may be configured to reflect excitation light onto the sample position.

It is understood that in other embodiments, the turning apparatus may further include more reflecting mirrors and/or lenses as needed, so as to adjust corresponding light beams, which is not repeated herein again.

Figure 20:
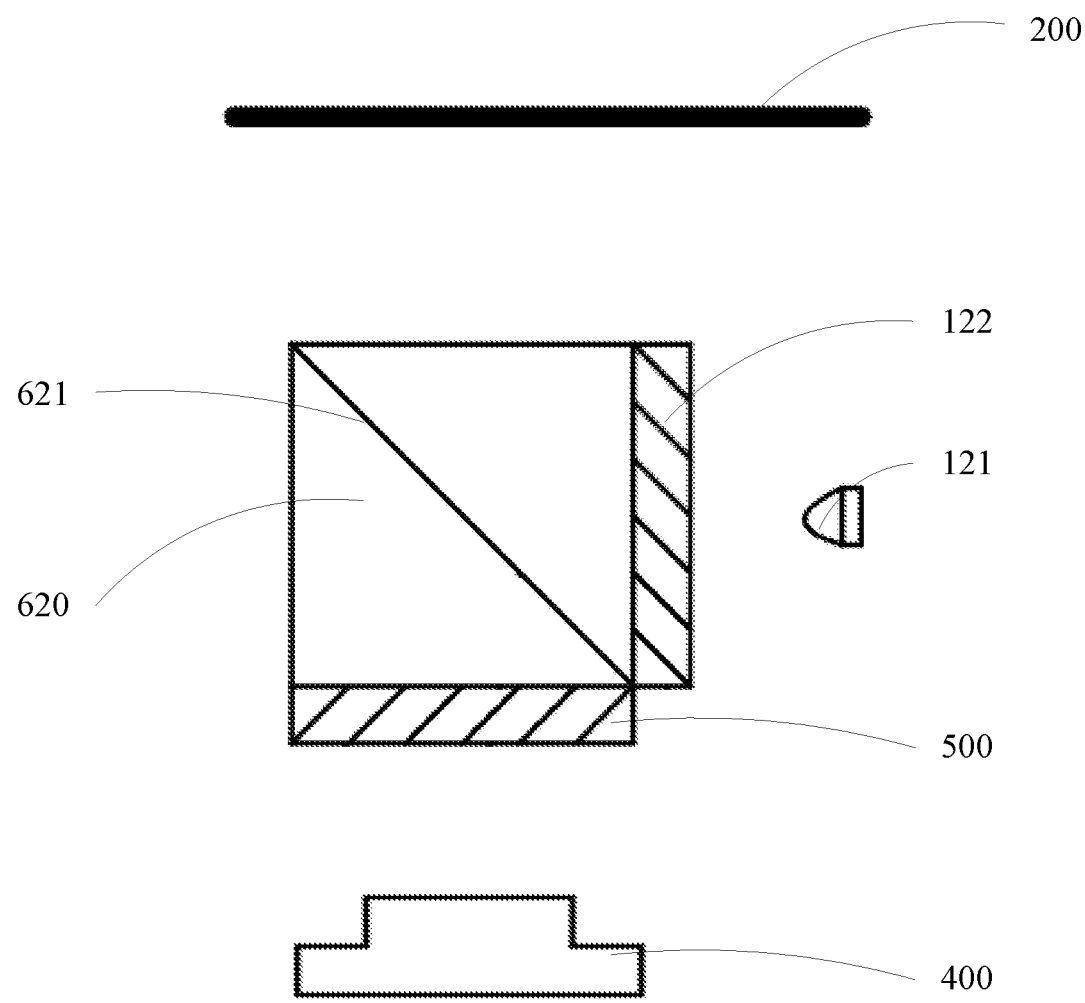
FIG. 20 shows a schematic structural diagram of an optical detection device according to a yet another exemplary embodiment of the present disclosure.

In yet another exemplary embodiment of the present disclosure, as shown in FIG. 20, the turning apparatus may include a second dichroscope 620, which may be configured to reflect the excitation light onto the sample position where the sample 200 under test is located, and to make the first and second light signals transmit onto the detection apparatus 400.

In order to extend the lifetime of the second filter 500, the second filter 500 may be disposed between the second dichroscope 620 and the detection apparatus 400. In this way, the light signal from the sample 200 under test may first pass through the second dichroscope 620, part of which may be pre-filtered out by the second dichroscope 620, and then reach the detection apparatus 400 by the filtering of the second filter 500.

In the embodiment shown in FIG. 20, the sample 200 under test may be disposed above the light source apparatus 100 and the second dichroscope 620, and the detection apparatus 400 may be disposed below the light source apparatus 100 and the second dichroscope 620, to receive the first light signal and the second light signal generated by the sample 200 under test and transmitted through the second dichroscope 620. In this way, the sample 200 under test can be conveniently placed at or removed from the sample position in the optical detection device, and an overall structure of the optical detection device can be more compact.

Further, the second dichroscope 620 may be presented as a cuboid block, the second filter 500 may be attached to a first surface of the second dichroscope 620, the first filter 122 of the light source apparatus 100 may be attached to a second surface of the second dichroscope 620 perpendicular to the first surface, and a reflective surface 621 of the second dichroscope 602 may be at a 45 degree angle with respect to both the first surface and the second surface. In this way, the second dichroscope 620, the first filter 122 and the second filter 500 may be integrated together, thereby making the structure of the optical detection device more compact, and there is no need to provide separate supports and the like for the first filter 122 and the second filter 500.

In some embodiments, the optical detection device may further include a memory, which may be communicatively connected with the detection apparatus and be configured to store a detection signal for further processing.

In some other embodiments, the optical detection device may further include a processor, which may be communicatively connected with the detection apparatus and be configured to process the detection signal. For example, when the detection apparatus is an imaging apparatus, the processor may directly read image signals generated by the imaging apparatus and use a corresponding algorithm to obtain information such as size distribution, position distribution, and count of the biological particles in the images, thereby further simplifying the detection process. The processor may also be communicatively connected with the memory in the optical detection device, and program instructions corresponding to the algorithm may also be stored in the memory of the optical detection device.

Figure 21:
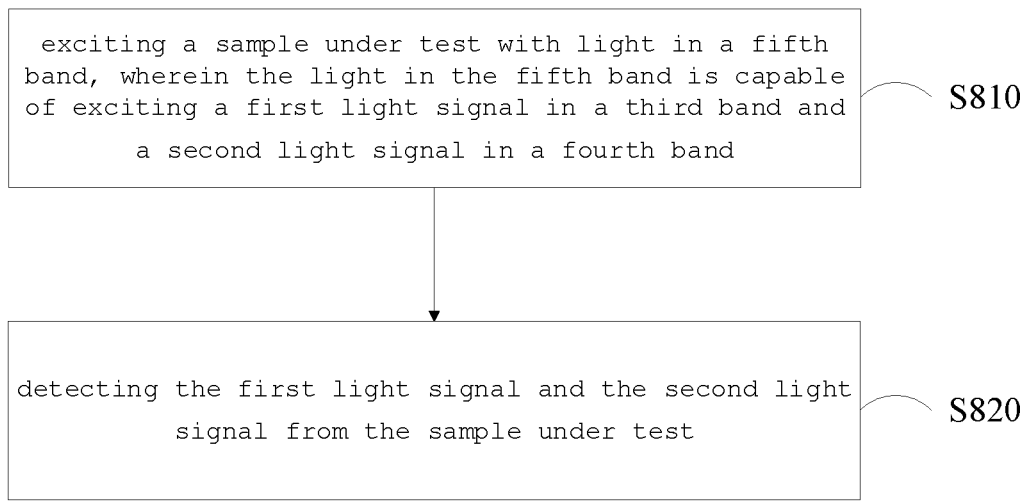
FIG. 21 shows a schematic flow diagram of an optical detection method according to an exemplary embodiment of the present disclosure.

The present disclosure also provides an optical detection method, as shown in FIG. 21, which may include:
  step S100, exciting a sample under test with light in a fifth band, wherein the light in the fifth band is capable of exciting a first light signal in a third band and a second light signal in a fourth band, the third band and the fourth band are separated from each other, a maximum wavelength of the third band is less than a minimum wavelength of the fourth band, and a maximum wavelength of the fifth band is less than or equal to a minimum wavelength of the third band; and
  step S200, detecting the first light signal and the second light signal from the sample under test.

In some embodiments, before exciting a sample under test with light in the fifth band, the optical detection method may further include staining the sample under test with a predetermined dye, to obtain desired information of the sample under test.

In the optical detection device and method of the present disclosure, the sample under test may be excited with excitation light in a single wavelength or band, to generate corresponding light signals, and at least part of the generated light signals is distributed in multiple bands that are separated from one another. By analyzing the multiband light signals in a single detection, more comprehensive information about the sample under test can be obtained and the detection process is simplified.

Some particular examples of optical detection methods are listed below.

Example 1: Cell Count and Cell Viability 1.1 Fluorescent Staining
1) Count and Cell Viability of Adherent Growth Cells (e.g., HEK293 Cells)

Materials and Methods

HEK293 cells were statically cultured in a carbon dioxide incubator (5% $CO_2$, 37° C.) using DMEM culture medium containing 10% fetal bovine serum. When the cells were grown to a certain stage, such as the cell confluency of about 50%, the cells were digested with trypsin and resuspended in DMEM culture medium. The resuspended cells were mixed uniformly and added into a sample inlet tube, and placed at a sample inlet of an optical detection device, the optical detection device could automatically add the sample into consumables embedding AO (acridine orange), PI (propidium iodide) dyes through a pipette device, and perform count and viability evaluation of the sample by using an imaging device and related programs. AO could pass through an integral cell membrane, and be embedded into nucleus of all cells (living and dead cells); while PI could only pass through an incomplete cell membrane and be embedded into nucleus of all dead cells. Observed with the imaging device, AO stained cells exhibited green fluorescence, and PI stained cells exhibited red fluorescence. When the two dyes were both present in the nucleus, under an appropriate ratio of AO and PI, the two dyes underwent energy resonance transfer, such that the living cells were excited under the blue channel (EX: 470/20, EM: 535/40) to emit green fluorescence, and the dead cells were excited under the green channel (EX: 470/20, EM: 600 LP) to emit red fluorescence.

Results

Both AO and PI could immediately stain the HEK293 cells, the living cells, dead cells and total cells were judged according to staining results, and according to the cell staining results of AO and PI in combination, the cell concentration and viability could be accurately determined using the optical detection device and method of the present disclosure.

2) Count and Cell Viability of Suspension Growth Cells (e.g., Jurket Cells)
3) Count and Cell Viability of Insect Cell Lines (e.g., S2 & Sf9 Cell Lines)
4) Count and Cell Viability of Primary Cells (e.g., Human Peripheral Blood Cells, Murine Splenocytes, and Bone Marrow Cells)

Materials and Methods

The above cell lines and primary cells were collected in an experimental general mode. After being collected, the cells were uniformly mixed and added into a sample inlet tube, and placed at a sample inlet of an optical detection device, the optical detection device could automatically add the sample into consumables embedding AO and PI dyes through a pipette device, and perform count and viability evaluation of the sample by using an imaging device and related programs.

Results

The results were consistent with those of HEK293 cells. Both AO and PI could immediately stain the corresponding cells, the living cells, dead cells and total cells were judged according to staining results, and according to the cell staining results of AO and PI in combination, the cell concentration and viability could be accurately determined using the device of the present disclosure.

1.2 Trypan Blue Staining
1) Count and Cell Viability of Adherent Growth Cells (e.g., HEK293 Cells)

Materials and Methods

HEK293 cells were statically cultured in a carbon dioxide incubator (5% $CO_2$, 37° C.) using DMEM culture medium containing 10% fetal bovine serum. When the cells were grown to a certain stage, such as the cell confluency of about 80%, the cells were digested with trypsin and resuspended in DMEM culture medium. The resuspended cells were mixed uniformly and added into a sample inlet tube, and placed at a sample inlet of an optical detection device, the optical detection device could automatically add the sample into consumables embedding trypan blue dye through a pipette device, and perform count and viability evaluation of the sample by using an imaging device and related programs. Trypan blue is a blue acidic dye containing two azo chromophores, and is a larger, hydrophilic and tetra-sulfonated anionic dye, and is commonly used for detecting integrity of cell membranes and evaluating cell survival rate. Because living cells are not stained, while dead cells take up the dye, non-stained living cells and blue-stained dead cells can be counted respectively.

Results

The trypan blue could immediately stain the HEK293 cells, the total cells were analyzed and identified according to bright-field imaging results, and the living cells and dead cells were judged according to staining results, and the cell concentration and viability could be accurately determined using the optical detection device and method of the present disclosure.

2) Count and Cell Viability of Suspension Growth Cells (e.g., Jurket Cells)

3) Count and Cell Viability of Insect Cell Lines (e.g., S2 & Sf9 Cell Lines)

Materials and Methods

The above cell lines were collected in a general mode. After being collected, the cells were uniformly mixed and added into a sample inlet tube, and placed at a sample inlet of an optical detection device, the optical detection device could automatically add the sample into consumables embedding trypan blue dye through a pipette device, and perform count and viability evaluation of the sample by using the imaging device and related programs.

Results

The results were consistent with those of HEK293 cells, the total cells were analyzed and identified according to bright-field imaging results, the living cells and dead cells were judged according to staining results, and the cell concentration and viability could be accurately determined using the optical Detection Device and Method of the Present Disclosure.

Example 2: Cell Transfection

1) Transfection Efficiency, Cell Count and Cell Viability of GFP Transfected Cells HEK293 is a human embryonic kidney cell line, and was transfected with GFP fused to a CMV promoter in this example. The dead cells were stained with PI, the transfected cells were detected with GFP, all the cells were image-identified, and the cell transfection efficiency, cell count and cell viability were detected.

Materials and Methods

HEK293 cells stably expressing GFP were cultured in a carbon dioxide incubator (5% $CO_2$, 37° C.) using DMEM culture medium containing 10% fetal bovine serum. After the cells were digested, 4 μl of PI staining fluid was added to 100 μl of HEK293 cells, and after being mixed uniformly, the cells were added into a sample inlet tube, and placed at a sample inlet of an optical detection device, the optical detection device could automatically add the sample into consumables without a dye through a pipette device, and perform the detection of cell transfection efficiency, cell count and cell viability by using an imaging device and related programs. PI is a membrane impermeable dye, and stains only dead cells. All the cells were imaged and identified in the bright-field channel; the GFP-transfected cells were excited under the blue channel to emit green fluorescence, and the dead cells were excited under the green channel to emit red fluorescence.

Results

Living cell transfection efficiency=GFP transfected cells/(number of bright-field cells−number of dead cells)×100%

Cell transfection efficiency=GFP transfected cells/bright-field cells×100%

Cell viability=(number of bright-field cells−number of dead cells)/bright-field cells×100%

2) Transfection Efficiency and Cell Count of RFP Transfected Cells

CHO cell is a Chinese hamster ovary cell, and was transfected with RFP fused to a CMV promoter in this example. The transfected cells were detected with RFP, all the cells were image-identified, and the transfection efficiency and cell count were detected.

Materials and Methods

HEK293 cells stably expressing GFP were cultured in a carbon dioxide incubator (5% $CO_2$, 37° C.) using DMEM culture medium containing 10% fetal bovine serum. After the cells were digested, they were mixed uniformly, added into a sample inlet tube, and placed at a sample inlet of an optical detection device, the optical detection device automatically added the sample into consumables without a dye through a pipette device, and the cell transfection efficiency and cell count were detected by using an imaging device and related programs. All the cells were imaged and identified under the bright-field channel, and the RFP transfected cells were excited under the green channel to emit red fluoresce.

Results

Cell transfection efficiency=RFP transfected cells/bright-field cells×100%

Example 3: Cell Apoptosis

1) Cell Apoptosis Analysis for Annexin V-FITC, 7AAD

Phosphatidylserine (PS) in healthy, non-apoptotic cells is predominantly located on an inner side of the cell membrane, but the cell membrane is integral early in apoptosis, so at this time the PS can flip from the inner side of the cell membrane to a surface of the cell membrane, to be exposed in an extracellular environment. Annexin V is a calcium-dependent phospholipid binding protein with a molecular weight of 35-36 KD, and can be specifically bound to PS with high affinity, and Annexin V has been proved to be a useful tool for detecting apoptosis. After Annexin V is labeled with fluorescein FITC, the labeled Annexin V can be used as a fluorescent probe to detect the occurrence of cell apoptosis.

7-AAD (7-amino-actinomycin D) or PI is a nucleic acid dye, and cannot pass through a normal plasma membrane; along with the processes of cell apoptosis and cell death, the integrity of cell membrane of such cell is lost, and the permeability of the plasma membrane to a dye is gradually increased; in combination with controlled degradation of DNA during cell apoptosis, bright red fluorescence can be emitted under the excitation of excitation light with a proper wavelength, and the cells can be grouped according to the strength of 7-AAD labeled DNA. By using Annexin V in combination with 7-AAD or PI, viable apoptotic cells, non-viable apoptotic cells and necrotic cells can be distinguished.

Materials and Methods

CHO cells were inoculated in a 6-well plate at a density of 200,000 cells/well, and then statically cultured in a carbon dioxide incubator (5% $CO_2$, 37° C.) for 24 hours using DMEM culture medium containing 10% fetal bovine serum. After 24 hours, the old culture medium was removed and a fresh cell culture solution containing nocodazole at a certain concentration was added to induce apoptosis. The plate was incubated for an additional 6 hours at 37° C. in a 5% $CO_2$ incubator, and then the cells were digested and collected. Annexin V-FITC and 7-AAD or PI staining was performed according to apoptosis kit instructions. The stained sample was uniformly mixed and then added into a sample inlet tube, and placed at a sample inlet of an optical detection device, the optical detection device could automatically add the sample into consumables without a dye through a pipette device, and perform cell apoptosis analysis by using the optical detection device, method and related programs of the present disclosure. All the cells were imaged and identified under the bright-field channel, the Annexin V-FITC stained cells were excited under the blue channel to emit green fluorescence, and the non-viable apoptotic cells and necrotic cells were excited under the green channel to emit red fluorescence.

Results

With the optical detection device and method of the present disclosure, all the cells were identified by imaging. Three cells were found under the device, in which unstained cells were living cells, the cells that were not stained with PI (red fluorescence) but were stained with Annexin V-FITC (green fluorescence) were viable apoptotic cells, and the cells that were stained with PI and Annexin V-FITC were non-viable apoptotic cells or necrotic cells. The results of early apoptosis rate, late apoptosis rate and cell viability could be obtained by formula calculations.

2) Detection of Early Apoptosis by Detecting Mitochondrial Membrane Potential Change Disruption of the mitochondrial membrane potential is a symbolic event that occurs early in apoptosis. Changes in the mitochondrial membrane potential following induction of apoptosis in cells result in changes in membrane permeability. In normal mitochondria, JC-1 aggregates in a mitochondrial matrix to form a polymer which emits strong red fluorescence; for unhealthy mitochondria, JC-1 can only exist as a monomer in cytoplasm due to the decrease or loss of membrane potential, and green fluorescence is generated. The change in color therefore reflects very directly the change in the mitochondrial membrane potential.

To analyze mitochondrial membrane potential changes and the resulting apoptosis, cells were cultured with a selected cationic dye (e.g., JC-1) and analyzed with the device of the present disclosure at a corresponding wavelength.

Materials and Methods

CHO cells were inoculated in a 6-well plate at a density of 200,000 cells/well, and then statically cultured in a carbon dioxide incubator (5% $CO_2$, 37° C.) for 24 hours using DMEM culture medium containing 10% fetal bovine serum. After 24 hours, the old culture medium was removed and a fresh cell culture solution containing nocodazole at a certain concentration was added to induce apoptosis. The plate was incubated for an additional 6 hours at 37° C. in a 5% $CO_2$ incubator, and the cells were digested and collected. The cells were stained for 10 minutes with JC-1 and resuspended in PBS for later use, according to mitochondrial membrane potential kit instructions. The stained sample was uniformly mixed and then added into a sample inlet tube, and placed at a sample inlet of an optical detection device, the optical detection device could automatically add the sample into consumables without a dye through a pipette device, and perform the cell apoptosis analysis by using the optical detection device and method of the present disclosure.

Results

Apoptotic cells were identified by quantifying red fluorescence and green fluorescence, while all the cells were identified by bright-field imaging. The optical detection device and method of the present disclosure could be used to identify cells in early apoptosis.

Example 4: Detection and Quantification of Antigen

Low magnification fluorescence microscopic devices are useful for obtaining accurate information about expression levels of antigens (e.g., intracellular and cell surface proteins) in a population of cells.

1) Detection and Quantification of Cell Surface Markers (e.g., CD Markers)

Cell surface protein expression levels can be determined by direct incubation with a fluorescently-conjugated primary antibody (e.g., FITC-labeled antibody) that recognizes antigen, the unbound antibody is washed clean after incubation, and cell surface marker fluorescence is detected and quantified. The intensity of the fluorescent signal is proportional to an amount of antigen on the cell surface. For example, CD molecules include, CD3, CD4 and CD8 of T cells, CD11, CD34, CD45, CD44, CD73, CD90, CD105 of MSC cells, etc.; besides the evaluation of antigens, other reagents can be used together therewith to detect and obtain information such as cell count, viability and the like.

Materials and Methods

Cultured T cells were taken for cell surface protein detection. A sample of 6*105 cells was taken for CD staining analysis. After being centrifuged for 3 min at 400 g, removing supernatant, it was added with 100 μl of Cell staining buffer for resuspension, added with 3 μl of FIFC-labeled CD3 specific antibody for staining, mixed lightly, incubated for 30 min in the dark; after being centrifuged for 3 min at 400 g, removing supernatant, it was added with 100 μl of Cell staining buffer to resuspend the cells, and then subjected to sample loading and detection. The stained sample was uniformly mixed and then added into a sample inlet tube, and placed at a sample inlet of an optical detection device, the optical detection device could automatically add the sample into consumables without a dye through a pipette device, and perform the detection and quantitative analysis of the cell surface markers by using the optical detection device and method and related programs of the present disclosure. All the cells were imaged and identified under the bright-field channel, and the T cells stained were excited under the blue channel to emit green fluorescence.

Results

The T cell CD3 surface marker was analyzed and detected with the device, and nearly 100% of the cells emitted green fluorescence, which was consistent with the expected result, thus the optical detection device and method of the present disclosure could be used for the detection and quantification of the cell surface markers.

2) Detection and Quantification of Antibody Affinity

The antibody affinity at cellular level measured by an immunofluorescence method is a very important index for evaluating antibody effect. The antibody affinity can be directly and quantitatively evaluated by detecting an average fluorescence intensity presented by different antigen-antibody reactions through an indirect immunofluorescence method, and the cell concentration and viability can also be detected at the same time.

Materials and Methods

Protein X was stably expressed using a modified CHO cell line, for evaluation of the affinity of a generic drug (primary antibody). CHO cells were digested, the cell concentration was measured, the cell concentration was adjusted to 1000000 cells/reaction, centrifugation was performed at 400 g for 3 min, the supernatant was removed, and 200 μl of staining buffer was added to resuspend the cells. The primary antibody with different concentration gradients was used to perform incubation for 1 h at 37° C., respectively, the unbound antibody was washed out by centrifugation after incubation, the supernatant was removed, and 200 μl of staining buffer was added to resuspend the cells, the solution was added with a fluorescently-conjugated secondary antibody, such as Alexa 488, that identified the primary antibody, and incubated for 30 minutes at room temperature in the dark, the supernatant was removed by centrifugation after incubation, the unbound secondary antibody was washed out, 200 μl of staining buffer was used for resuspension, then the sample was divided into two parts each having 100 μl of the cell sample, in which one part was supplemented with PBS to reach a volume of 500 μl and analyzed using a flow cytometry, and the other part was added into a sample inlet tube and placed at a sample inlet of an optical detection device, and the optical detection device automatically adds the sample into consumables without a dye through a pipette device, and perform the detection of the cell surface marker and the quantitative analysis of cell fluorescence intensity.

Results

All the cells were imaged and identified under the brightfield channel, and the primary antibody at different concentrations bound to the cells under the blue channel to produce fluorescence with different intensities. The antibody affinity was analyzed using the optical detection device, and the result was consistent with the detection result of the flow cytometry.

3) Detection and Quantification of Intracellular Antigen Expression

The cells were incubated with a primary antibody that recognized the antigen, the unbound antibody was washed out after incubation, and a fluorescently-conjugated secondary antibody (e.g., a FITC-labeled antibody) that recognized the primary antibody was added to the solution. Unbound secondary antibody was washed out and intracellular fluorescence was detected and quantified using the device of the present disclosure. In a similar manner, the cells were fixed and subjected to infiltration treatment, then incubated with corresponding antibody, and subjected to the detection of intracellular antigen, and the detection of whether partial positive clones were lost due to degeneration or gene mutation, resulting in serious degradation of MAb yield in the cells, thereby performing the identification and evaluation of the stability of cell strains. The intensity of the fluorescent signal was proportional to an amount of antigen in the cells. The method could be used for detecting and quantifying different intracellular antigens. Besides the evaluation of antigens, other reagents could be used together therewith to detect and obtain information such as cell count, viability and the like.

Materials and Methods

A cell concentration of $2*10^6$ cells/reaction was measured with a CHO cell strain capable of stably expressing protein X, centrifugation was performed for 3 min at 400 g to remove supernatant, 1000 μl of PBS was added for washing once; centrifugation was performed to remove supernatant; BD Cytofix/Cytoperm™ Fixation/Permeabilization Solution Kit was used for fixation and perforation, and the treatment was performed for 30 min according to Protocol; the sample was centrifuged to remove supernatant, PBS was added for washing once, then PBS was added again for resuspension, each group of cells was added with a fixed-volume of antibody anti-Fab'-FITC, and incubated for 30 minutes at 4° C. in the dark; centrifugation was performed to remove supernatant, 1000 μl of PBS was added for resuspension, after being mixed uniformly, it was divided into two parts, one part was detected using a flow cytometry, and the other part was concentrated to 200 μl and added into a sample inlet tube and placed at a sample inlet of an optical detection device, and the optical detection device could automatically add the sample into consumables without a dye through a pipette device, and perform the detection and quantitative analysis of the cell fluorescence intensity.

Results

All the cells were imaged and identified under the brightfield channel, the antibody bound to the cells under the blue channel and emitted fluorescence, the degraded cells did not generate fluorescence, and a proportion of the cells capable of generating fluorescence was calculated, namely a proportion of positive cell strains. The detection and quantification of the intracellular antigen expression performed by using the optical detection device were consistent with that of the flow cytometry.

Example 5: Cell Killing

The killing effect of CAR-T cells on tumor cells was monitored by using non-toxic, non-radioactive CFSE or Calcein AM stained or GFP-targeted tumor cells. Living target cancer cells emitted green fluorescence under a fluorescence device, dead target cancer cells could not retain the green fluorescence, and after the target cells and effector cells reacted for a preset time, PI dye was added to stain the dead cells (T cells and tumor cells).

Materials and Methods

Target cells (K562) were collected, the number of cells was $4*10^7$; the cell concentration was adjusted to $1\times10^6$/mL, a CFSE staining solution with a certain concentration was added into the cell solution, and intermittent mixing incubation was performed for 30 minutes in a 5% $CO_2$ incubator at 37° C.; centrifugation was performed at 300 g for 3 minutes to remove supernatant, about 18 mL of serum-containing culture medium was added to reach a detected cell concentration of $2*10^6$/mL; $1\times10^6$ target cells/well (about 500 μl of target cells) were inoculated into a 12-well plate, according to the ratios of effector cells to target cells (E:T ratios) of 5:1, 1:1 and 0.5:1, respectively, a corresponding number of effector cells were added to each well, i.e., the effector cell numbers were 5×106, 1×106 and 0.5×106 (if the original effector cell concentration was 1*107/mL, then 500 μl, 100 μl, 50 μl of effector cells were added, respectively, and the final volume for each well was adjusted to 1 mL with the culture medium), 3 wells were repeated for each group, and the group containing only the culture medium and the cells was used as a control group. The cells were collected after adding the effector cells for 4 hours; the cell suspension was taken out, and a volume of 100 μl of the cell suspension was added with 1 μl of PI staining solution; after being pipetted and beaten evenly, the sample was added into a sample inlet tube and placed at a sample inlet of an optical detection device; the optical detection device could automatically add the sample into consumables without a dye through a pipette device to perform detection and analysis. All the cells were imaged and identified under the bright-field channel, the living target cancer cells were excited under the blue channel to emit green fluorescence, and the dead cells were excited under the green channel to emit red fluorescence.

Results

By identifying the PI-stained cells as dead cells to eliminate the dead cells to generate autofluorescence, the number of cells that emitted green fluorescence could accurately represent the number of the living target cancer cells, and by calculating a difference between the number of the living target cancer cells under different E:T ratios and the number of the living target cancer cells of the control group, the number of the cell-killed cells could be accurately obtained, while the cell killing rate was defined by the formula: cell killing rate=(number of living target cancer cells of control group−number of living target cancer cells of sample group)/number of living target cancer cells of control group*100%. The detection of cell killing effect with the optical detection device could effectively avoid detection errors caused by incomplete release of fluorescein, centrifugation and the like.

Example 6: Cell Cycle

1) Quantification of DNA Content in Mammalian Cells

Propidium Iodide (PI) is a fluorescent dye for double-stranded DNA. After PI binds to double-stranded DNA, fluorescence can be generated, and the integral fluorescence intensity of PI-stained cells has a stoichiometric relation with the content of DNA. After the DNA in the cells is stained with propidium iodide, the DNA content of the cells can be measured, and then cell cycle analysis can be performed according to the distribution of the DNA content.

In this example, PI was taken as a DNA staining agent to measure DNA contents in cells such as adherent cell lines, suspension cell lines, MCF-7, Jurket, etc., and the cell cycle results were analyzed.

Materials and Methods

HEK293 cells were statically cultured in a carbon dioxide incubator (5% $CO_2$, 37° C.) in DMEM culture medium containing 10% fetal bovine serum, and when the cells had grown to have a confluency of about 90%, the cells were washed with PBS, digested with trypsin, centrifuged and collected.

For each cell sample, about one million cells were collected and placed in a 1.5 mL centrifuge tube; and the cells were precipitated by centrifugation at 400 g for 3~5 minutes. The supernatant was removed by pipetting, and about 500 μl of ice bath pre-cooled PBS was added to resuspend the cells. The cells were precipitated again by centrifugation, the supernatant was carefully removed by pipetting, and the bottom of the centrifuge tube was gently flicked to disperse the cells properly to avoid clumping of the cells. 500 μl of ice bath pre-cooled 60% ethanol was added in the centrifuge tube, the cells were mixed uniformly by pipetting gently, and fixed at 4° C. for 2 hours or more.

The cells were precipitated by centrifugation at about 400 g for 3~5 minutes, about 200 μl of ice bath pre-cooled PBS was added to resuspend the cells, the cells were precipitated again by centrifugation, the supernatant was carefully removed by pipetting, and the cells were resuspended in a PI staining solution (20 ug of RNA enzyme and 2 ug of propidium iodide were added into 200 μl of PBS containing 0.1% (V/V) Triton X-100), and incubated for 30 minutes at 37° C. in the dark, then the sample was mixed uniformly and divided into two parts, each having 100 μl of the cell sample, in which one part was supplemented with PBS to a volume of 500 μl and analyzed by a flow cytometry, and the other part was added into a sample inlet tube and placed at a sample inlet of an optical detection device, and the optical detection device could automatically add the sample into consumables without a dye through a pipette device, and perform the analysis by using the optical detection device and method and related programs of the present disclosure.

Results

By analyzing the PI-stained HEK293 cells with the optical detection device of the present application, accurate intracellular DNA content data could be obtained on the basis of flow cytometry software analysis, and cell cycle results were further formed. The results were comparable to the results of the flow cytometry. The optical detection device could therefore be used for cell cycle analysis.

2) Effect of Drug on DNA Content in Mammalian Cells

Materials and Methods

When HEK293 cells were cultured to reach a confluency of about 50%, they were subjected to serum starvation or treated with nocodazole or camptothecin at a certain concentration, then the cells were digested with trypsin, centrifuged and collected. The cell analysis was performed using PI staining to quantify the DNA content in the cells.

Results

Like the cell cycle detection method of the mammalian cells, by analyzing the effect of the drug on the cell cycle of the mammalian cells with the optical detection device of the present disclosure, accurate intracellular DNA content data could be obtained on the basis of flow cytometry software analysis, and the result was comparable to that of the flow cytometry. The optical detection device of the present disclosure could therefore be used to study the effects of different drugs on the cell cycle.

In all examples shown and discussed herein, any particular value should be construed as exemplary only but not as limiting. Thus, other examples of the exemplary embodiments may have different values.

The terms "front", "back", "top", "bottom", "above", "below" and the like in the description and in the claims, if any, are used for descriptive purposes and not necessarily for describing permanent relative positions. It is to be understood that the words so used are interchangeable under appropriate circumstances such that the embodiments of the present disclosure described herein, for example, can operate in other orientations than those illustrated or otherwise described herein.

As used herein, the word "exemplary" means "as an example, instance, or illustration", but not as a "model" that is to be reproduced exactly. Any implementation exemplarily described herein is not necessarily to be construed as preferred or advantageous over other implementations. Furthermore, the present disclosure is not limited by any expressed or implied theory presented in the preceding TECHNICAL FIELD, BACKGROUND, SUMMARY or DETAILED DESCRIPTION.

As used herein, the word "substantially" is intended to encompass any minor variations due to design or manufacturing imperfections, tolerances of devices or components, environmental influences and/or other factors. The word "substantially" also allows for differences from a perfect or ideal situation due to parasitics, noise, and other practical considerations that may exist in a practical implementation.

The above description may indicate elements or nodes or features being "connected" or "coupled" together. As used herein, unless expressly stated otherwise, "connected" means that one element/node/feature is directly connected to (or directly communicates with) another element/node/feature, either electrically, mechanically, logically, or otherwise. Similarly, unless expressly stated otherwise, "coupled" means that one element/node/feature may be mechanically, electrically, logically or otherwise joined to another element/node/feature in a direct or indirect manner to allow interaction, even though the two features may not be directly connected. That is, "coupled" is intended to cover both direct and indirect joining of elements or other features, including connections utilizing one or more intermediate elements.

It will be further understood that the word "comprise/include" when used herein, specifies the presence of stated features, integers, steps, operations, elements, and/or components, but do not preclude the presence or addition of one or more other features, integers, steps, operations, elements, components, and/or combination thereof.

Those skilled in the art will appreciate that the boundaries between the above described operations are merely illustrative. Multiple operations may be combined into a single operation, single operations may be distributed in additional operations, and operations may be performed at least partially overlapping in time. Moreover, alternative embodiments may include multiple instances of a particular operation, and the order of operations may be altered in various other embodiments. However, other modifications, variations, and replacements are also possible. The description and drawings should be regarded as illustrative rather than restrictive.

Although some particular embodiments of the present disclosure have been described in detail by way of example, it should be understood by those skilled in the art that the above examples are for illustration only and are not intended to limit the scope of the present disclosure. The various embodiments disclosed herein may be combined arbitrarily without departing from the spirit and scope of the present disclosure. Those skilled in the art will also appreciate that various modifications might be made to the embodiments without departing from the scope and spirit of the present disclosure. The scope of the present disclosure is defined by the appended claims.

What is claimed is:

1. A microscopic device, comprising a light source apparatus for optical detection and an objective lens disposed opposite to the light source apparatus with respect to a sample position, wherein the light source apparatus comprises:
    a first light source assembly configured to generate a first emergent light propagating in a first direction;
    a second light source assembly configured to generate a second emergent light propagating in a second direction, wherein the second direction and the first direction intersect with each other, one of the first emergent light and the second emergent light is a light for illumination, another one of the first emergent light and the second emergent light is a light for excitation, one of the first and second light source assemblies that is configured to generate the light for illumination is an illumination light source assembly, and another one of the first and second light source assemblies that is configured to generate the light for excitation is an excitation light source assembly, the light for illumination and the light for excitation are configured to be switched on at different time;
    a first dichroscope disposed at a location where the first direction intersects the second direction, and configured to make at least part of the first emergent light that is in a first band of wavelength transmit to continue propagating in the first direction, and to reflect at least part of the second emergent light that is in a second band of wavelength to propagate in the first direction, wherein the first band of wavelength and the second band of wavelength are different from each other;
    wherein the illumination light source assembly comprises:
        an illumination light source; and
        a diaphragm disposed between the illumination light source and the first dichroscope, and configured to block part of the light for illumination to form composite illumination combined with bright-field illumination and dark-field illumination simultaneously, wherein the diaphragm comprises a light shielding screen, one light-passing hole provided at a central location of the light shielding screen to form the bright-field illumination, and a plurality of light-passing holes or light-passing slits provided on the light shielding screen and distributed around the light-passing hole at the central location to form the dark-field illumination;
            wherein a distance R1 between an outer edge of the light-passing hole provided at the central location of the light shielding screen and a center of the diaphragm, a distance l between the diaphragm and the sample position, and a numerical aperture n of the objective lens satisfy following relationship: $R1 \leq l \cdot tg[arcsin(n)/3]$, and a distance R2 between an inner edge of the light-passing hole or light-passing slit distributed around the light-passing hole at the central location and the center of the diaphragm, the distance l between the diaphragm and the sample position, and the numerical aperture n of the objective lens satisfy following relationship:

$$R2 > l \cdot tg[arcsin(n)].$$

2. The microscopic device according to claim 1, wherein a minimum wavelength of the light for illumination is greater than a maximum wavelength of the light for excitation.

3. The microscopic device according to claim 1, wherein the illumination light source assembly further comprises:

a second lens disposed between the illumination light source and the diaphragm, and configured to collimate the light for illumination.

4. The microscopic device according to claim 1, wherein the illumination light source comprises at least one of a thermal radiation light source or a light emitting diode.

5. The microscopic device according to claim 1, wherein the diaphragm comprises an adjustable diaphragm configured to enable part of the light for illumination that passes through the diaphragm to be changed.

6. The microscopic device according to claim 1, wherein the excitation light source assembly comprises:
    an excitation light source; and
    a first filter disposed between the excitation light source and the first dichroscope, and configured to filter light generated by the excitation light source.

7. The microscopic device according to claim 6, wherein the excitation light source assembly further comprises:
    a third lens disposed between the excitation light source and the first filter, and configured to collimate the light generated by the excitation light source.

8. The microscopic device according to claim 6, wherein the excitation light source comprises at least one of a light emitting diode or a laser.

9. The microscopic device according to claim 6, wherein the first filter comprises a bandpass filter.

10. The microscopic device according to claim 1, wherein the first direction and the second direction are perpendicular to each other.

11. The microscopic device according to claim 1, wherein incident angles of the first emergent light and the second emergent light with respect to the first dichroscope are both 45 degrees.

12. The microscopic device according to claim 1, wherein the microscopic device further comprises:
    a fourth lens disposed between the first dichroscope and the sample position, and configured to converge at least one of the first emergent light or the second emergent light to the sample position.

* * * * *